US010155643B2

(12) United States Patent
Mueller

(10) Patent No.: US 10,155,643 B2
(45) Date of Patent: Dec. 18, 2018

(54) MATERIAL HANDLER FOR CONSTRUCTION SITE

(71) Applicant: MCF Distributing, LLC, Mill Creek, WA (US)

(72) Inventor: Mark S. Mueller, Mill Creek, WA (US)

(73) Assignee: MCF Distributing, LLC, Mill Creek, WA (US)

(*) Notice: Subject to any disclaimer, the term of this patent is extended or adjusted under 35 U.S.C. 154(b) by 168 days.

(21) Appl. No.: 15/267,612

(22) Filed: Sep. 16, 2016

(65) Prior Publication Data

US 2017/0081114 A1   Mar. 23, 2017

Related U.S. Application Data

(60) Provisional application No. 62/220,935, filed on Sep. 18, 2015.

(51) Int. Cl.
*B66C 1/22* (2006.01)
*B62B 3/00* (2006.01)
*B66C 1/12* (2006.01)
*B66C 1/16* (2006.01)

(52) U.S. Cl.
CPC .............. *B66C 1/22* (2013.01); *B62B 3/00* (2013.01); *B66C 1/125* (2013.01); *B66C 1/16* (2013.01)

(58) Field of Classification Search
CPC .......... B66C 1/16; B66C 1/223; B66C 1/226; B66C 1/22

USPC ...... 414/10, 332; 312/297; 220/9.1, 9.2, 9.3, 220/9.4
See application file for complete search history.

(56) References Cited

U.S. PATENT DOCUMENTS

| | | | | | |
|---|---|---|---|---|---|
| 2,332,999 | A | * | 10/1943 | Garvey | B65D 9/14 206/386 |
| 2,517,757 | A | * | 8/1950 | Adlerstein | A45F 3/04 190/9 |
| 2,685,398 | A | * | 8/1954 | King | B65D 19/14 108/51.3 |
| 3,105,617 | A | * | 10/1963 | Felldin | B65D 77/061 220/493 |
| 3,114,453 | A | * | 12/1963 | Rosenthal | B65D 15/22 220/9.1 |
| 3,624,889 | A | * | 12/1971 | Greenhalgh | B60P 3/14 29/771 |
| 3,827,744 | A | * | 8/1974 | Ferdelman | B66C 1/16 294/67.1 |
| 3,831,712 | A | * | 8/1974 | Neely | B65G 69/00 414/267 |

(Continued)

*Primary Examiner* — Michael Safavi
(74) *Attorney, Agent, or Firm* — Robert R. Richardson, P.S.

(57) ABSTRACT

Various disclosed embodiments include apparatuses for handling construction site materials, methods of fabricating an apparatus for handling construction site materials, and methods of moving materials at a construction site. Given by way of example only and not of limitation, a non-limiting, illustrative apparatus for handling construction site materials includes: a frame defining an opening therein at a front of the frame; a mesh configured to fit over the frame; and a sliding mechanism disposable in the frame and configured to permit materials to be loaded into and unloaded out of the frame through the opening.

19 Claims, 26 Drawing Sheets

(56) References Cited

U.S. PATENT DOCUMENTS

| | | | | |
|---|---|---|---|---|
| 3,876,099 A * | 4/1975 | Land | B66C 1/16 | 212/255 |
| 3,930,585 A * | 1/1976 | Lynch | B65G 59/02 | 248/339 |
| 4,287,250 A * | 9/1981 | Rudy | A43B 13/20 | 428/166 |
| 4,478,549 A * | 10/1984 | Stelly | B65G 69/30 | 182/104 |
| 4,488,326 A * | 12/1984 | Cherry | B66F 7/0625 | 14/69.5 |
| 4,733,896 A * | 3/1988 | Klein | F22B 37/00 | 294/67.1 |
| 5,011,360 A * | 4/1991 | Abram | B65D 90/623 | 220/324 |
| 5,184,929 A * | 2/1993 | Reynolds | B66C 1/16 | 294/67.22 |
| 5,289,937 A * | 3/1994 | Boots | B65D 88/1631 | 220/666 |
| 5,507,237 A * | 4/1996 | Barrow | B65D 19/08 | 108/53.1 |
| 5,941,405 A * | 8/1999 | Scales | B65D 88/522 | 220/1.5 |
| 6,006,934 A * | 12/1999 | Skrysak | A47B 21/045 | 220/9.1 |
| 6,105,804 A * | 8/2000 | Stoffer | B65D 77/061 | 200/511 |
| 6,299,009 B1 * | 10/2001 | Ryziuk | B64D 9/00 | 220/1.5 |
| 6,299,354 B2 * | 10/2001 | Nickell | B65D 88/1625 | 220/9.2 |
| 7,066,647 B2 * | 6/2006 | Peska | B65D 31/12 | 190/107 |
| 7,140,376 B2 * | 11/2006 | Zheng | A63B 9/00 | 135/128 |
| 8,256,635 B2 * | 9/2012 | Schardein | B65D 88/14 | 220/1.5 |
| 8,342,348 B2 * | 1/2013 | Lin | B65D 25/00 | 220/9.1 |
| 9,558,472 B1 * | 1/2017 | Tubilla Kuri | G05B 19/041 | |
| 2007/0102315 A1 * | 5/2007 | Garcia De Alba | B65D 19/10 | 206/386 |
| 2007/0277707 A1 * | 12/2007 | Robbins | B65D 5/445 | 108/53.1 |
| 2013/0015184 A1 * | 1/2013 | Lake | B65D 19/0028 | 220/9.4 |
| 2013/0112686 A1 * | 5/2013 | Kwon | B65D 7/28 | 220/9.4 |

* cited by examiner

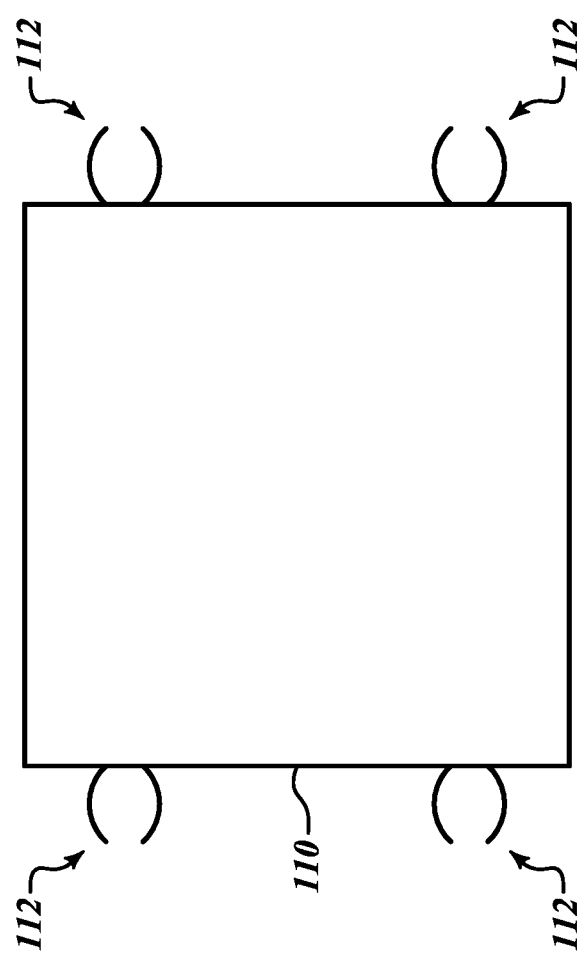

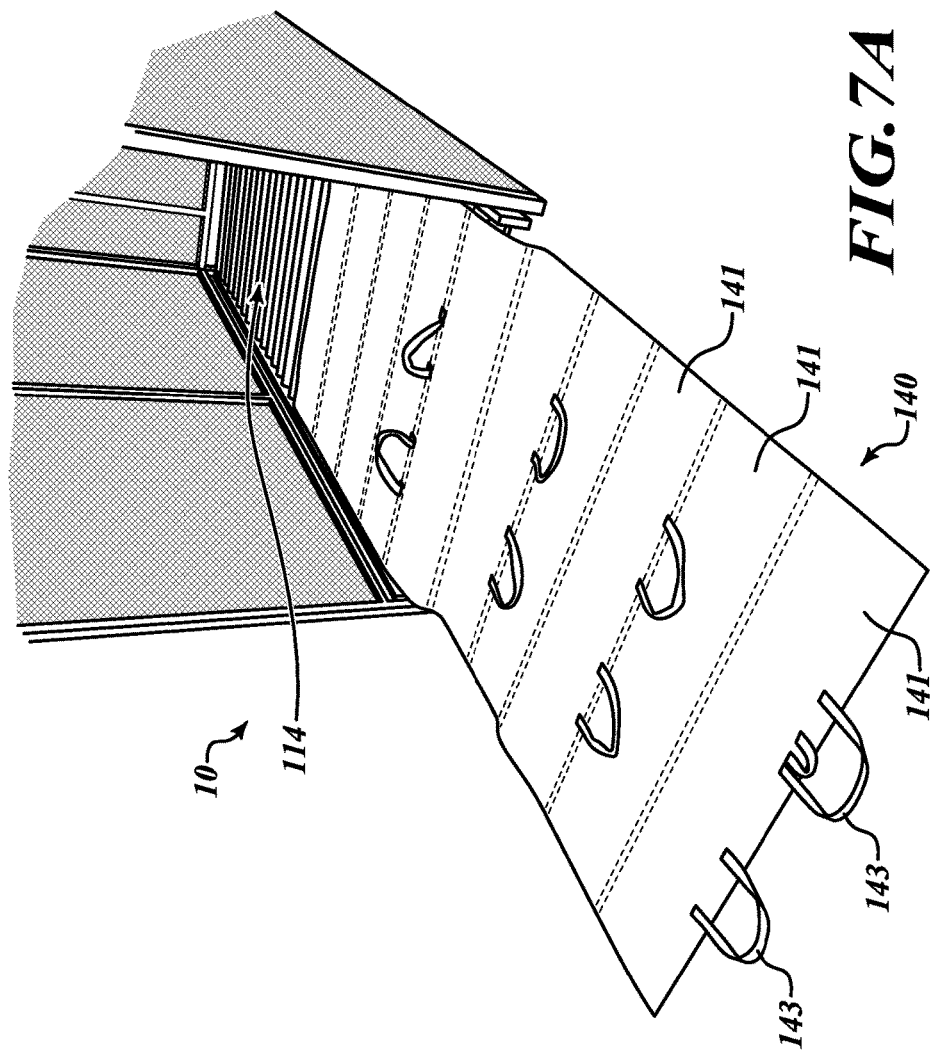

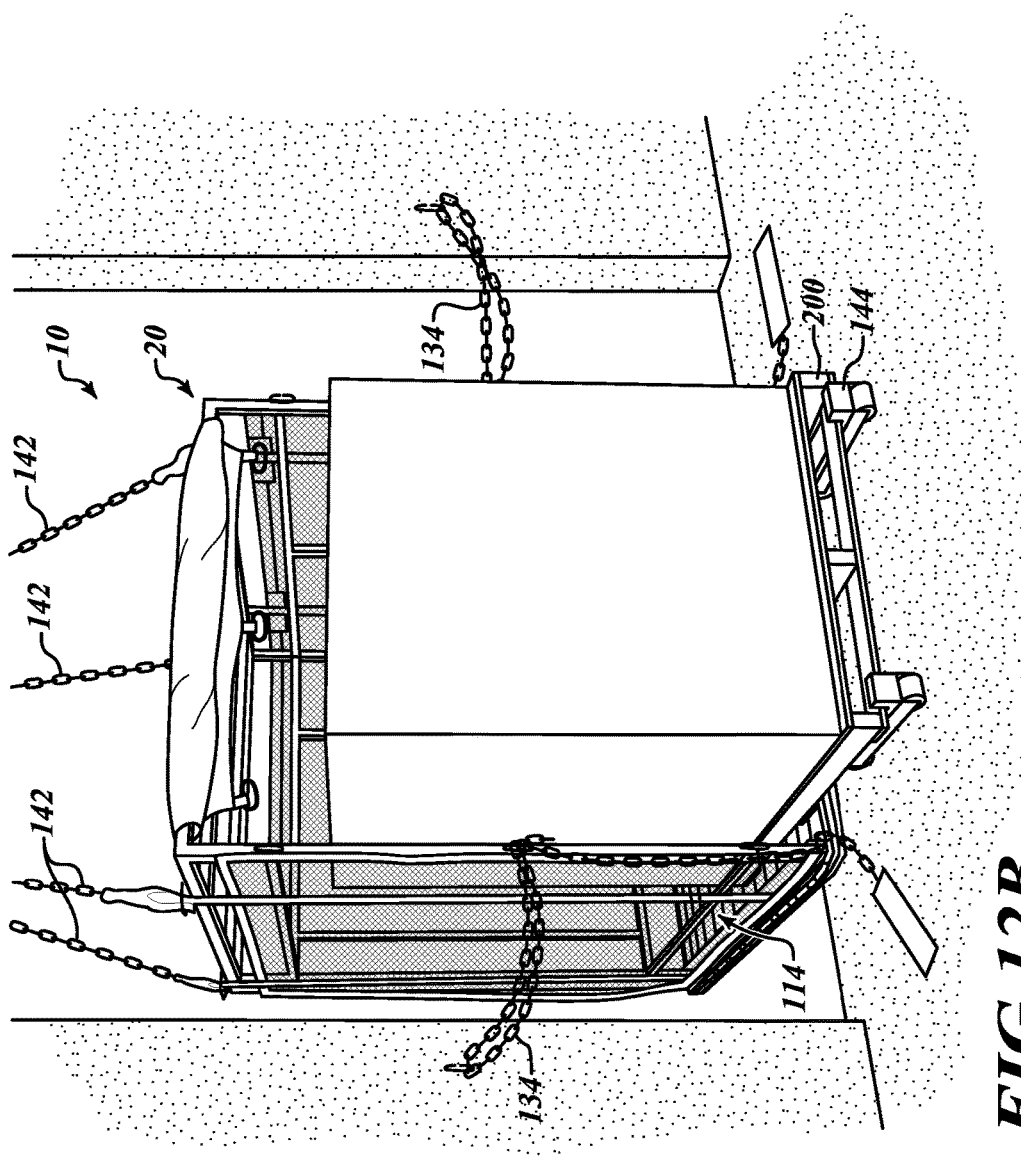

MATERIAL HANDLER FOR CONSTRUCTION SITE

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

Priority Applications

The present application claims the benefit of the earliest available effective filing date(s) from U.S. Provisional Patent Application Ser. No. 62/220,935, entitled MATERIAL HANDLER FOR CONSTRUCTION SITE, naming Mark S. Mueller as inventor, filed 18 September 2015 with attorney docket no. 129394-000202.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

The present disclosure relates to material handlers for construction sites.

BACKGROUND

On a construction site, workers may sometimes move materials (such as, for example, windows, sliding glass doors, electrical wire, boxes, tools, toilets, shower stalls, doors, flooring material, pipe, cabinets, drywall, and the like) between a ground level and an upper level of a building or structure under construction.

One known technique for moving such materials is to install a temporary, external freight elevator outside of the structure during construction. However, such an elevator may be expensive to rent (or purchase) and to maintain, may require a trained operator, may not be optimized for moving materials, and may not be moveable easily from one location to another location of the construction site or structure.

Another technique is to build a makeshift wooden "box" that can be loaded with materials and that can be moved by a crane or a forklift. However, such a wooden box may be unsafe, not load-rated, not ergonomically optimized, may take significant worker time to build and maintain, may be hard to load, and may require a worker to enter the box while the box is suspended by the crane or forklift. It will be appreciated that entering a structure—such as a wooden box—while the structure is suspended by a crane or forklift may be considered a safety hazard and/or a violation of applicable safety regulations.

SUMMARY

Disclosed embodiments include apparatuses for handling construction site materials, methods of fabricating an apparatus for handling construction site materials, and methods of moving materials at a construction site.

In an illustrative embodiment given by way of non-limiting example, a non-limiting, illustrative apparatus for handling construction site materials includes: a frame defining an opening therein at a front of the frame; a mesh configured to fit over the frame; and a sliding mechanism disposable in the frame and configured to permit materials to be loaded into and unloaded out of the frame through the opening.

In another illustrative embodiment given by way of non-limiting example, a non-limiting, illustrative method of fabricating an apparatus for handling construction site materials includes: attaching a bottom portion of a mesh to a perimeter portion of the mesh; disposing at least one sliding mechanism in a bottom portion of a frame; placing the bottom portion of the frame on top of the bottom portion of the mesh; forming a frame with frame components on top of the bottom portion of the frame such that a front of the frame defines an opening therein; and attaching the mesh to the frame such that the perimeter portion does not cover the opening defined in the front of the frame.

In another illustrative embodiment given by way of non-limiting example, a non-limiting, illustrative method of moving materials at a construction site includes: loading materials onto a sliding mechanism of a material handler through an opening defined in the front of the material handler; moving the loaded material handler to an opening defined in structure of an upper floor of a building under construction; and slidably removing the material from the material handler via the sliding mechanism.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the text (e.g., claims and/or detailed description) and/or drawings of the present disclosure.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIG. 5 is a plan view of an illustrative cover for the front of the material handler of FIG. 1.

The use of the same symbols in different drawings typically indicates similar or identical items unless context dictates otherwise.

DETAILED DESCRIPTION

Figure 1:
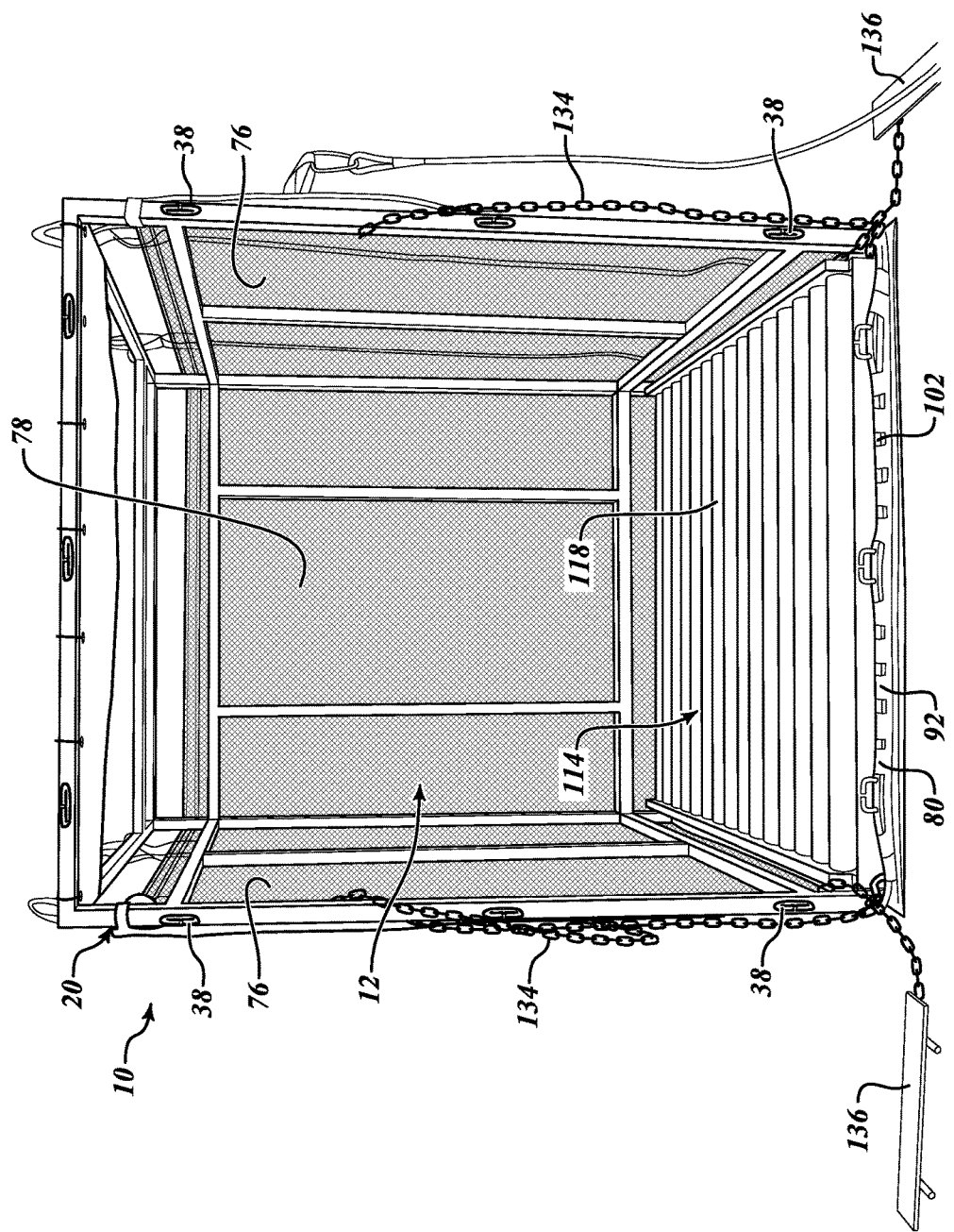
FIG. 1 is a front perspective view of an illustrative material handler.

Given by way of non-limiting overview and referring to FIG. 1, an illustrative material handler 10 may be used to move materials (such as, for example, windows, sliding glass doors, electrical wire, boxes, tools, toilets, shower stalls, doors, flooring material, pipe, cabinets, drywall, and the like) between a ground level and an upper level of a structure under construction. In various embodiments, the material handler 10 may be moved with a crane (such as a mobile crane, a tower crane, or the like) or a forklift. Embodiments of the material handler 10 are relatively light but can handle heavy loads (for example, up to around 3000 lbs. or so in some embodiments). Embodiments of the material handler 10 may have a front opening 12 that is sized to accommodate upper-floor sliding-glass doorway or window openings. In various embodiments, a sliding mechanism permits materials to be loaded into and removed from the inside of the material handler 10 without personnel entering the handler. Also, embodiments of the material handler 10 may be disassembled for storage or transport and re-assembled in a relatively short time (such as, for example, under 5 minutes or so), and when disassembled may occupy a volume that is about ¼ or so of the assembled volume. Details will be set forth below by way of illustrative examples and not of limitation.

Figure 2:
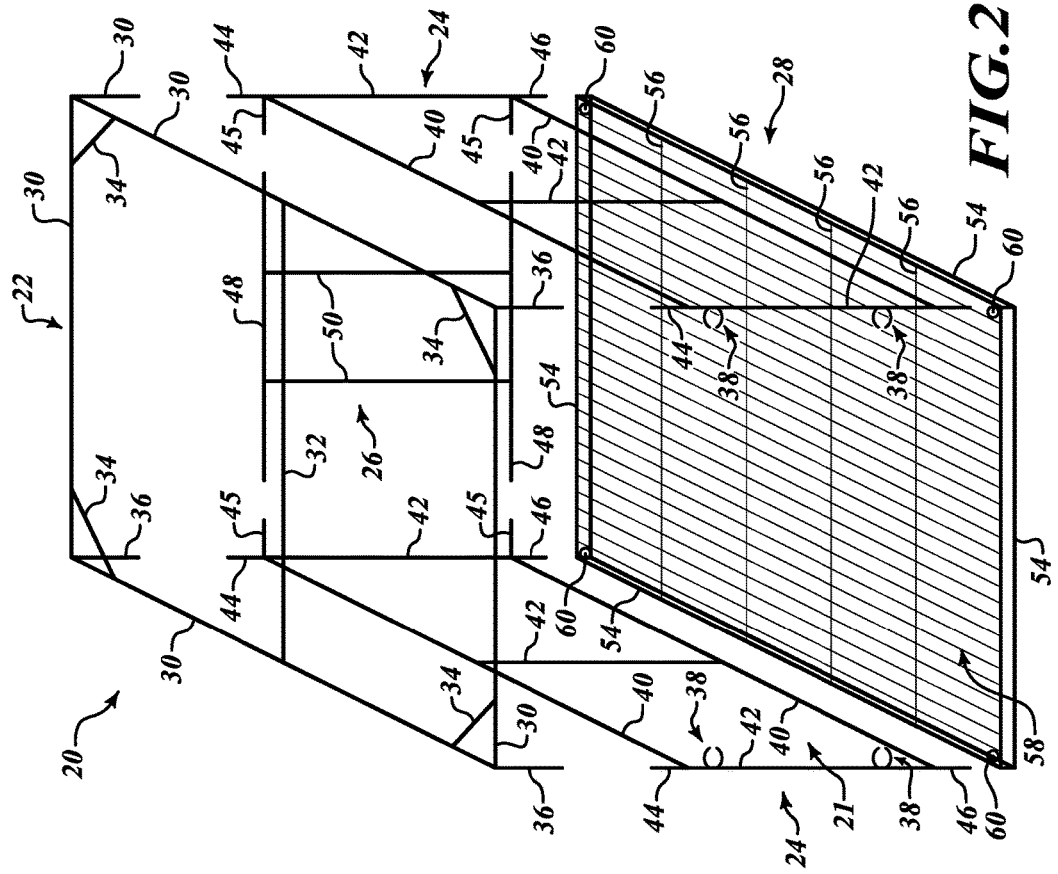
FIG. 2 is an exploded isometric view of an illustrative frame of the material handler of FIG. 1.

Referring additionally to FIG. 2 (which may not be drawn to scale), in some embodiments a frame 20 includes a front opening portion 21, top portion 22, two side portions 24, a rear portion 26, and a bottom portion 28. The frame portions 21, 22, 24, 26, and 28 may be formed from welded tubular steel, or from any other suitable material, and by any suitable method. The top portion 22 includes beams 30, a cross support 32, corner braces 34, and legs 36. Each side portion 24 includes beams 40, cross supports 42, top posts 44 (which are configured to fit into the respective legs 36), side posts 45, and legs 46. One or more C hooks 38 are attached to each cross support 42 at the front opening portion 21. The rear portion 26 includes beams 48, which are configured to receive the respective side posts 45, and cross supports 50. The bottom portion 28 includes beams 54, cross supports 56, a screen-type bottom 58 (the horizontal members of the bottom being omitted for clarity), and receptacles 60 (which are configured to receive the legs 46).

It will be appreciated that various other embodiments of the frame 20 are contemplated. For example, each portion 22, 24, 26 and 26 may have more or fewer cross supports than shown. Furthermore, the screen-type bottom 58 may be omitted. Moreover, pins or another securing mechanism may be used to secure, for example, the posts 44 in the legs 36, the posts 45 in the beams 48, and the legs 46 in the receptacles 60. In addition, the dimensions of the frame 20, and thus of the material handler 10, can be any suitable dimensions. For example, the frame 20 can be 4 feet wide by 8 feet high by 10 feet deep.

Figure 3:
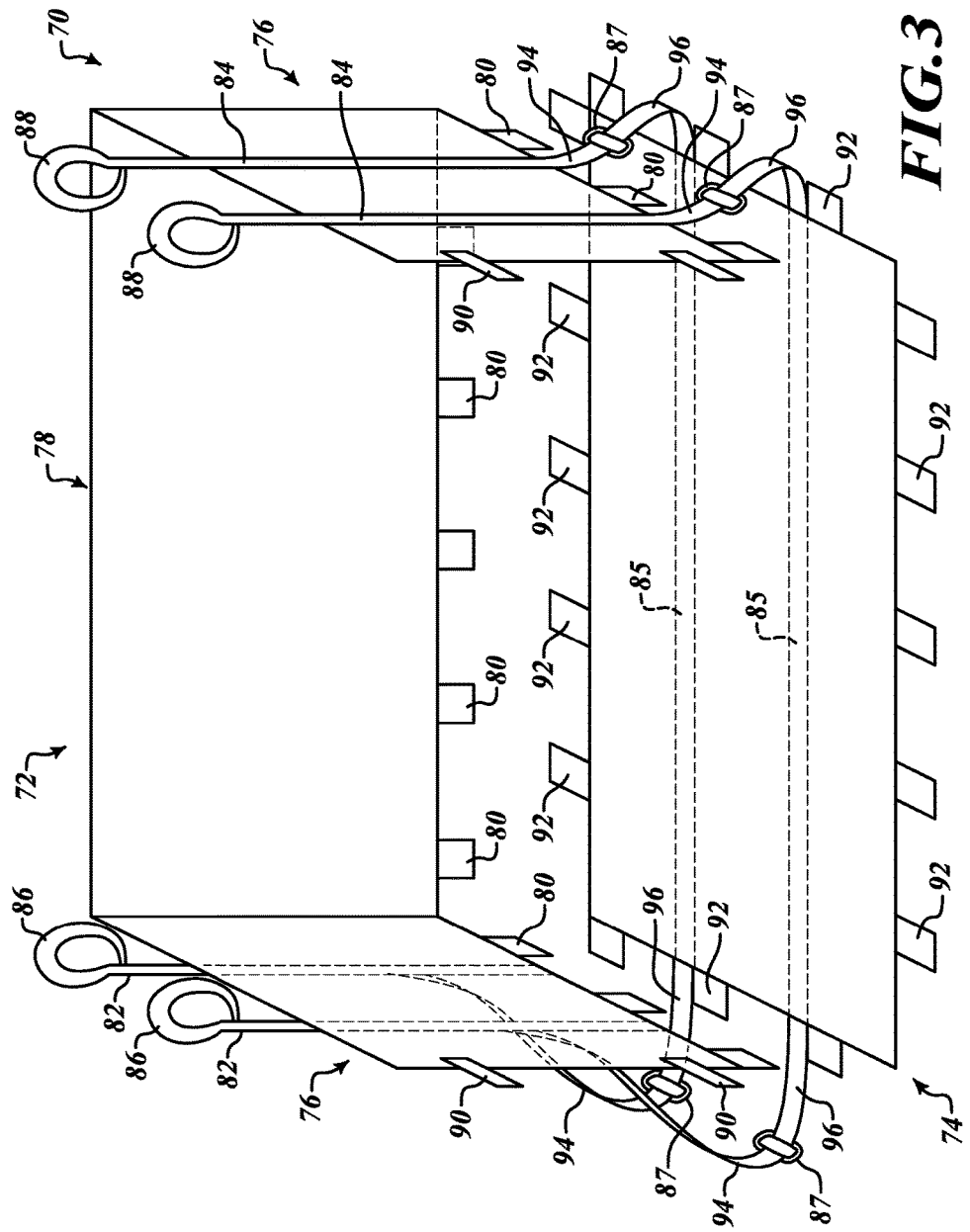
FIG. 3 is an exploded isometric view of an illustrative mesh.

Referring additionally to FIG. 3 (which may not be drawn to scale), a mesh 70 is configured to fit over the frame 20 (FIG. 2). The mesh 70 may be formed from any type of suitable mesh material, such as reinforced nylon or the like. The mesh 70 includes a perimeter portion 72 and a bottom portion 74.

The perimeter portion 72 suitably is formed as one piece, and includes two side portions 76 and a rear portion 78. Each side portion 76 and the rear portion 78 include tags 80, which are configured to receive a coupling member such as a rope or the like (not shown in FIG. 3) as described below. Each side portion 76 includes two lifting straps 82 and 84, which are attached (for example, sewn) to the mesh of the respective side portion 76 and which are configured (for example, by sewing) to form end loops 86 and 88. Furthermore, the side portions 76 and the rear portion 78 may include one or more coupling buckles 90 (not all coupling buckles are shown in FIG. 3), which may help secure the mesh 70 to the frame 20 (FIG. 2). The buckles 90 also hold the mesh 70 to the frame 20 (FIG. 2), for example, to the beams 40 or cross supports 42 of the frame side portions 24, or to the beams 48 or cross supports 50 of the frame rear portion 26. Such buckling of the buckles 90 is not required, but helps keep the mesh 70 in place. The bottom portion 74 includes tags 92, which are configured to receive the same coupling rope (not shown in FIG. 3) as the tags 80 and as described below. The bottom portion 74 also includes reinforcing straps 85 (shown in phantom), which are attached (for example, sewn) to the mesh of the bottom portion 74. It will be appreciated that the lifting straps 82 and 84 and the reinforcing straps 85 help reinforce the mesh 70.

Figure 3A:
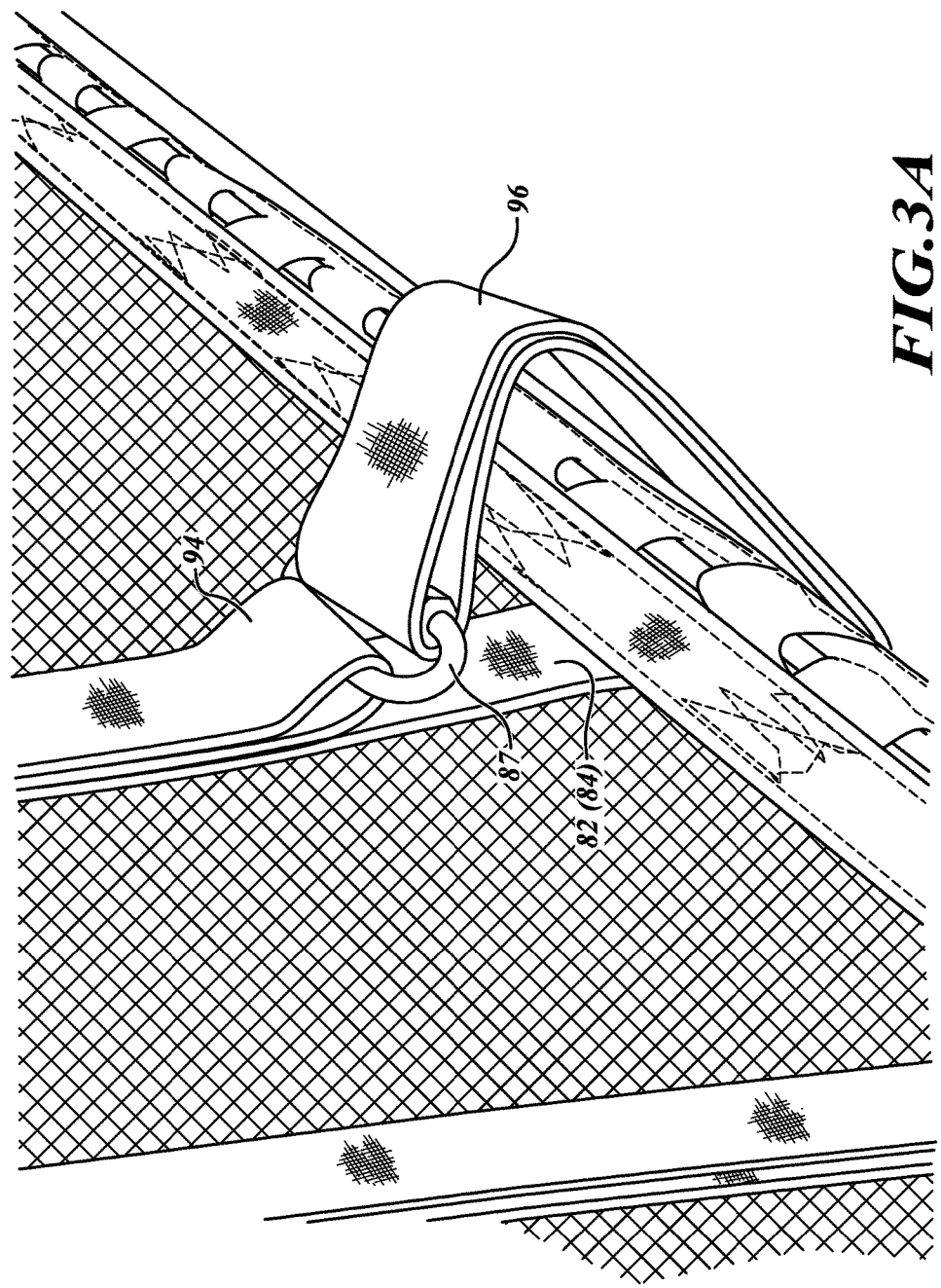
FIG. 3A illustrates a detail of the mesh of FIG. 3.

Referring additionally to FIG. 3A, the mesh 70 may also include safety straps 94 and 96. The safety straps 94 and 96 provide a redundancy in attaching the perimeter portion 72 to the bottom portion 74. Each safety strap 94 is sewn to its associated lifting strap 82 or 84 of the perimeter portion 72, and each safety strap 96 is sewn to its associated reinforcing strap 85 of the bottom portion 74. Each safety strap 94 is coupled to its associated safety strap 96 with a link 87. It is desirable to to leave slack in the safety straps 94 and 96.

Figure 4:
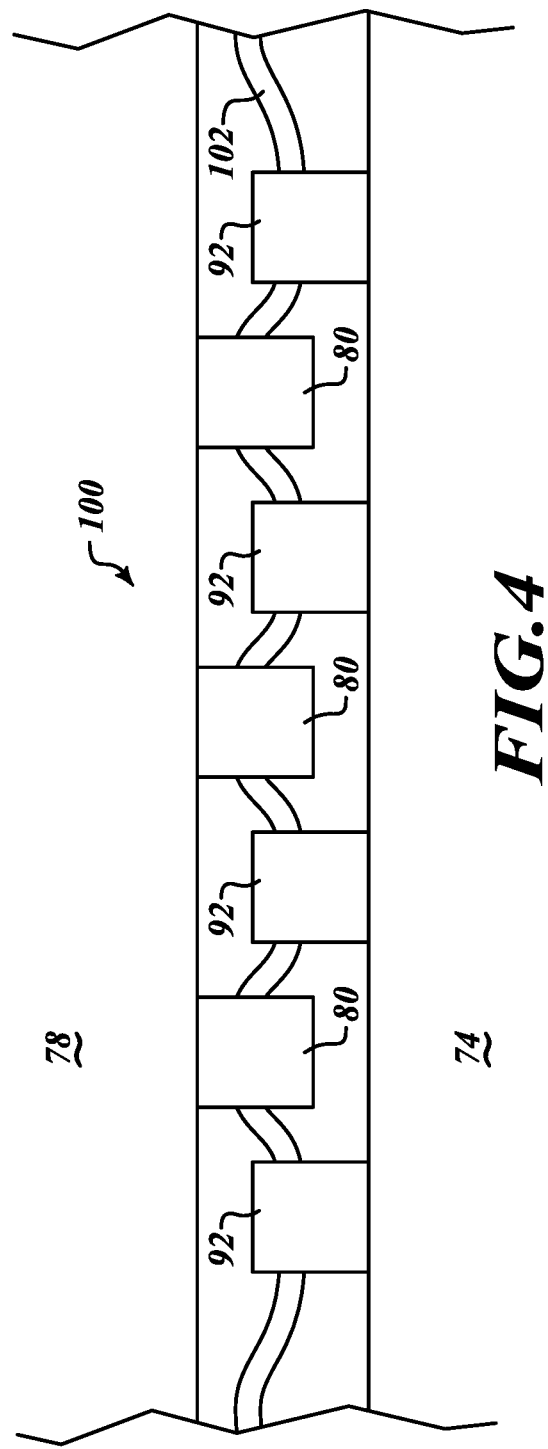
FIG. 4 is diagram of an illustrative coupling joint.

Referring additionally now to FIG. 4 (which may not be drawn to scale), a coupling joint 100 between the tags 80 and 92 is provided. The tags 80 and 92 are interleaved. A rope 102 is disposed through each of the tags 80 and 92. When tightened (typically during manufacture of the mesh 70), the rope 102 acts to pull the tabs 80 and 92 together in a zipper-like action. The coupling joint 100 provides additional strength to the mesh 70 (FIG. 3) and allows flexing of the joint with reduced wear. Even when pulled together by the tightening of the rope 102, there is a space between adjacent ones of the tags 80 and 92. These spaces facilitate the threading of the rope 102 through the tags during manufacture of the mesh 70. After the rope 102 is threaded through the tags 80 and 92, the two ends of the rope 102 may be spliced together (or otherwise attached) to prevent the rope 102 from falling out of the tags 80 and 92 under load. It will be appreciated that in other embodiments other coupling members may be used as desired, as such for example a chain or the like.

Referring additionally to FIG. 5 (which may not be drawn to scale), a cover 110 for the front 12 (FIG. 1) of the material handler 10 (FIG. 1) is provided. The cover 110 suitably may be made from the same material as the mesh 70 (FIG. 4). The cover 110 suitably includes C hooks 112 for attaching to the C hooks 38 (FIG. 2).

Figure 6A:
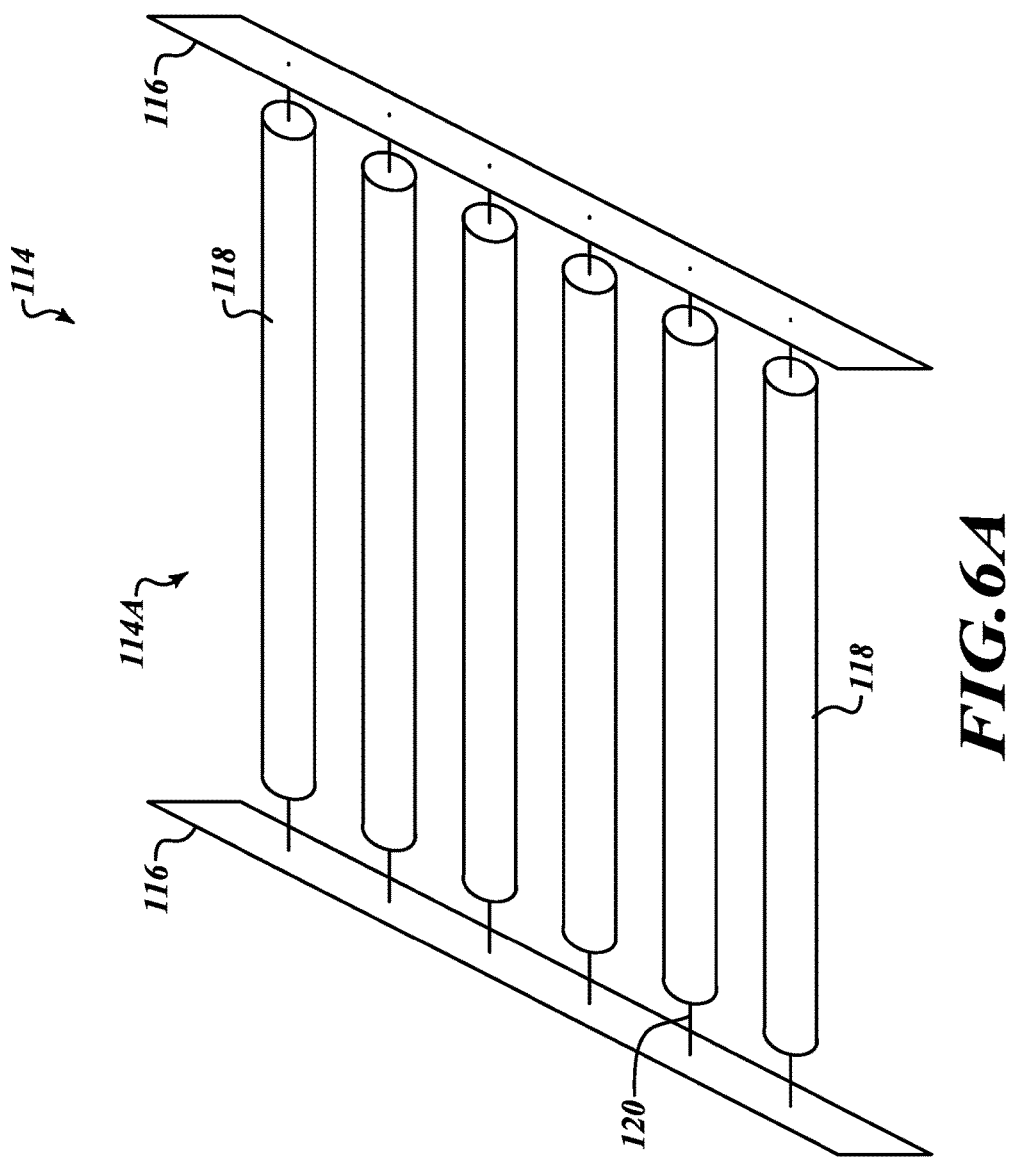
FIG. 6A is an isometric view of an illustrative sliding mechanism.
Figure 6B:
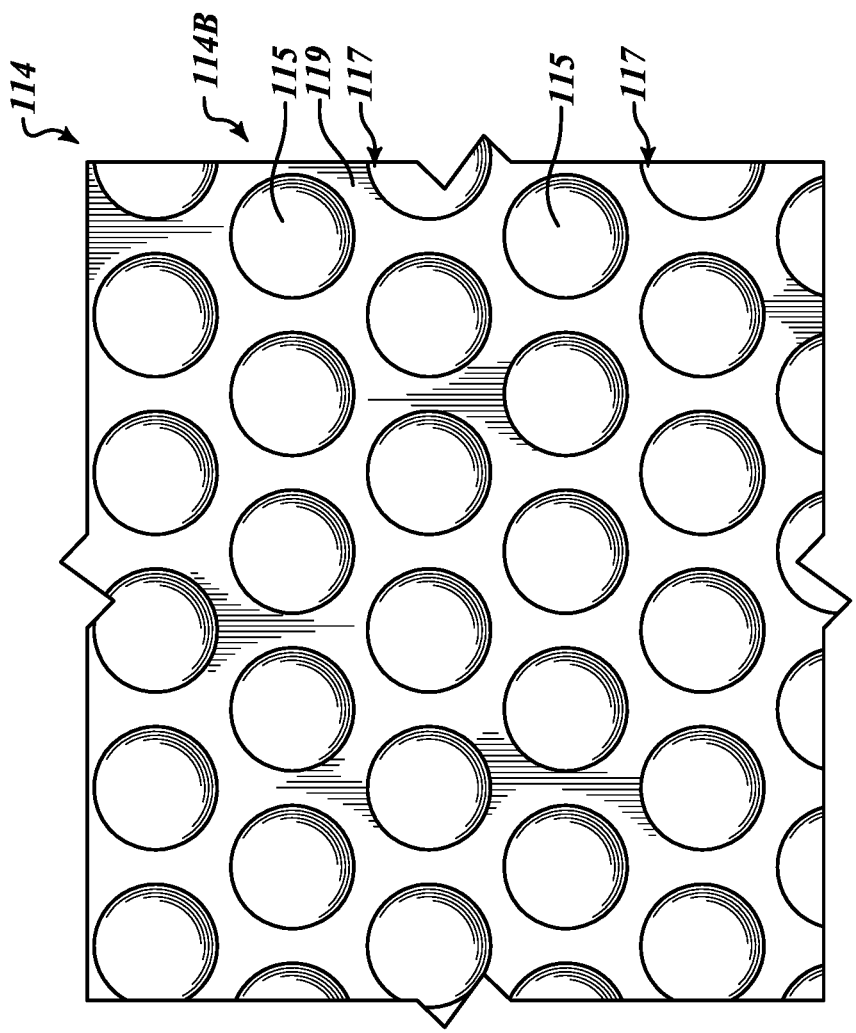
FIG. 6B is a top plan view of a portion of another illustrative sliding mechanism.

Referring additionally now to FIGS. 6A and 6B (which may not be drawn to scale), a sliding mechanism 114 may be disposed inside of the material handler 10 (FIG. 1) on the frame bottom 28 (FIG. 2) to allow easy insertion and removal of materials from the material handler 10. In some embodiments, the sliding mechanism 114 may include a roller-bar assembly 114A (FIG. 6A). In some of such embodiments, two roller-bar assemblies 114A (FIG. 6A) may be installed from back-to-front on the frame bottom 28 (FIG. 2). In such embodiments, the roller-bar assembly 114A includes support members 116, roller bars 118, and bearing supports 120 (all FIG. 6A), which attach the roller bars 118 to the support members 116 and that allow the roller bars 118 to roll freely with little friction. In some of such embodiments, two roller-bar assemblies 114A (FIG. 6A) may be installed from back-to-front on the frame bottom 28 (FIG. 2). In such embodiments, the roller-bar assembly 114A includes support members 116, roller bars 118, and bearing supports 120 (all FIG. 6A), which attach the roller bars 118 to the support members 116 and that allow the roller bars 118 to roll freely with little friction.

In some other embodiments and referring additionally to FIG. 6B, the sliding mechanism 114 may include a ball-bearing assembly 114B. In various embodiments, the ball-bearing assembly 114B may include ball bearings 115, each of which is disposed within a ball-bearing support (not shown) which permits its associated ball bearing 115 to rotate freely. In some such embodiments, the ball bearings 115 may be disposed in cutouts 117 formed in a sheet 119. In these embodiments, upper portions of the ball bearings 115 protrude above the top of the sheet 119 such that the ball bearings 115 may engage materials, thereby reducing friction and enabling personnel to insert and remove materials from the material handler 10 (FIG. 1). In some of such embodiments, two ball-bearing assemblies 114B may be installed from back-to-front on the frame bottom 28 (FIG. 2).

Figure 7:
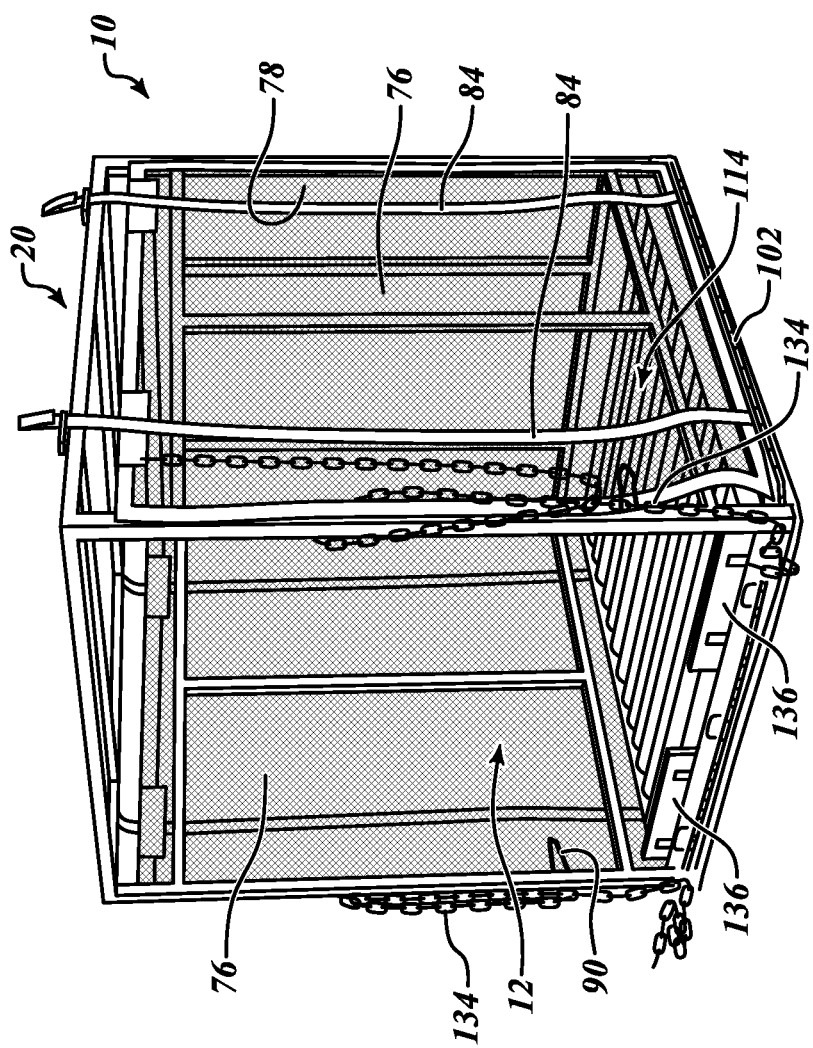
FIGS. 7-14 are perspective views of illustrative, assembled material handlers.

Referring additionally to FIG. 7, additional features of various embodiments of the material handler 10 may include brakes 130 and guard chains 134. The brakes 130 prevent material, or a pallet, inside of the material handler 10 from rolling out the front 12 of the material handler 10 while moving the loaded material handler 10 from one location to another. Each brake 130 has at least one peg (not shown in FIG. 7) that engages a receptacle attached to the front of the sliding mechanism 114 at the opening of the frame bottom 28 (FIG. 2), thereby preventing material from exiting the material handler 10.

As described below, the guard chains 134 can act as guard rails for worker safety while a crane or a forklift is holding the material handler 10 adjacent to an upper floor of a structure.

Referring additionally to FIG. 7A, an illustrative bottom mat 140 may be provided. The bottom mat 140 may be made of any material as desired with sufficient strength and durability, such as reinforced nylon or the like. If desired, the bottom mat 140 may include hinged, foldable sections 141. The bottom mat 140 suitably includes handles 143 that are attached to the fabric of the bottom mat 140 by any acceptable method, such as by sewing or the like. In various embodiments, two of the handles 143 are provided for selected ones of the sections 141.

Referring now to FIGS. 1-7A, an illustrative procedure for assembling the material handler 10 is described according to a non-limiting example given by way of illustration only and not of limitation. For purposes of describing this procedure, it is assumed that the material handler 10 comes from the manufacturer with the sliding mechanism(s) 114 already installed in the bottom portion 28 of the frame 20, the bottom portion 74 of the mesh 70 already under the bottom portion 28 of the frame 20, and the rope 102 already woven through the tabs 80 and 92.

First, the frame 20 is formed on top of the mesh 70 by: inserting the posts 45 of the frame sides 24 into the beams 48 of the frame rear 26; placing the top frame portion 22 over the assembled frame sides and rear 24 and 26 and allowing the top frame portion to drop such that the posts 44 insert into the legs 36; placing the assembled top, side, and rear frame portions 22, 24, and 26 over the frame bottom 28 and allowing the assembled frame structure to drop such that the legs 46 insert into the receptacles 60. Next, the buckles 90 are engaged and the rope 102 is looped around the C-hook holders 136 (and any other members along the bottom beams 54 that may be included for this purpose).

Figure 8:
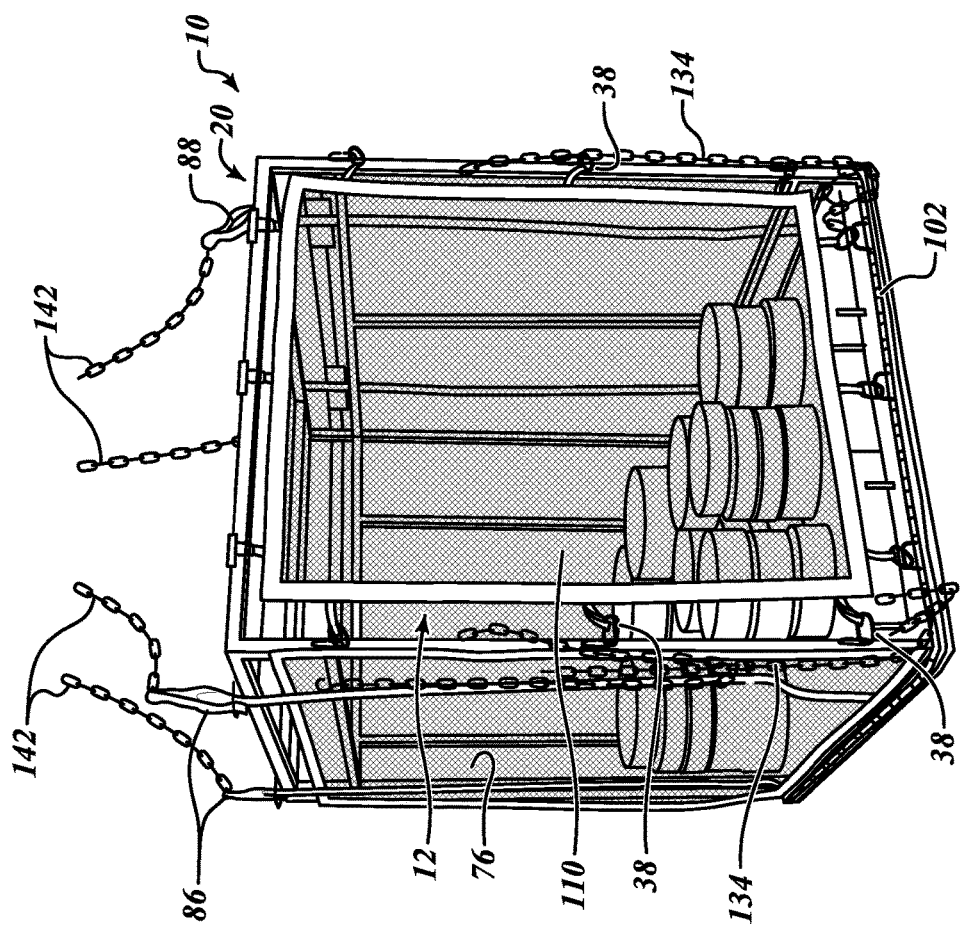

Referring additionally to FIG. 8, a procedure for loading the material handler 10 with materials is described according to various embodiments. The bottom mat 140 (see FIGS. 7A and 9) may placed over the sliding mechanism 114. However, depending on the materials to be loaded into the material handler 10, the bottom mat 140 may not be used. For example, a palette (described below) or other large item may be loaded directly onto the sliding mechanism 114. If the materials to be loaded will not fully occupy the entire area on top of the sliding mechanism 114, then filler (not shown), such as blocks of styrofoam or the like, may be placed in the back of the material handler 10. This loading scheme permits the loaded materials to be located toward the front of the material handler 10, thereby helping enable removal of the loaded material without a need to reach long distances into the material handler 10. This loading scheme also helps mitigate sliding of materials toward the back of the material handler 10 after the materials have been loaded. Material is loaded through the front 12 of the material handler 10 and onto the bottom mat 140 or onto the sliding mechanism 114, as appropriate for the materials to be loaded. Next, the front cover 110 is installed by engaging the C hooks 112 with the C hooks 38. Then, crane chains 142 are engaged with the strap loops 86 and 88 (described below is an alternate procedure where the material handler 10 is to be moved with a forklift).

Figure 9:
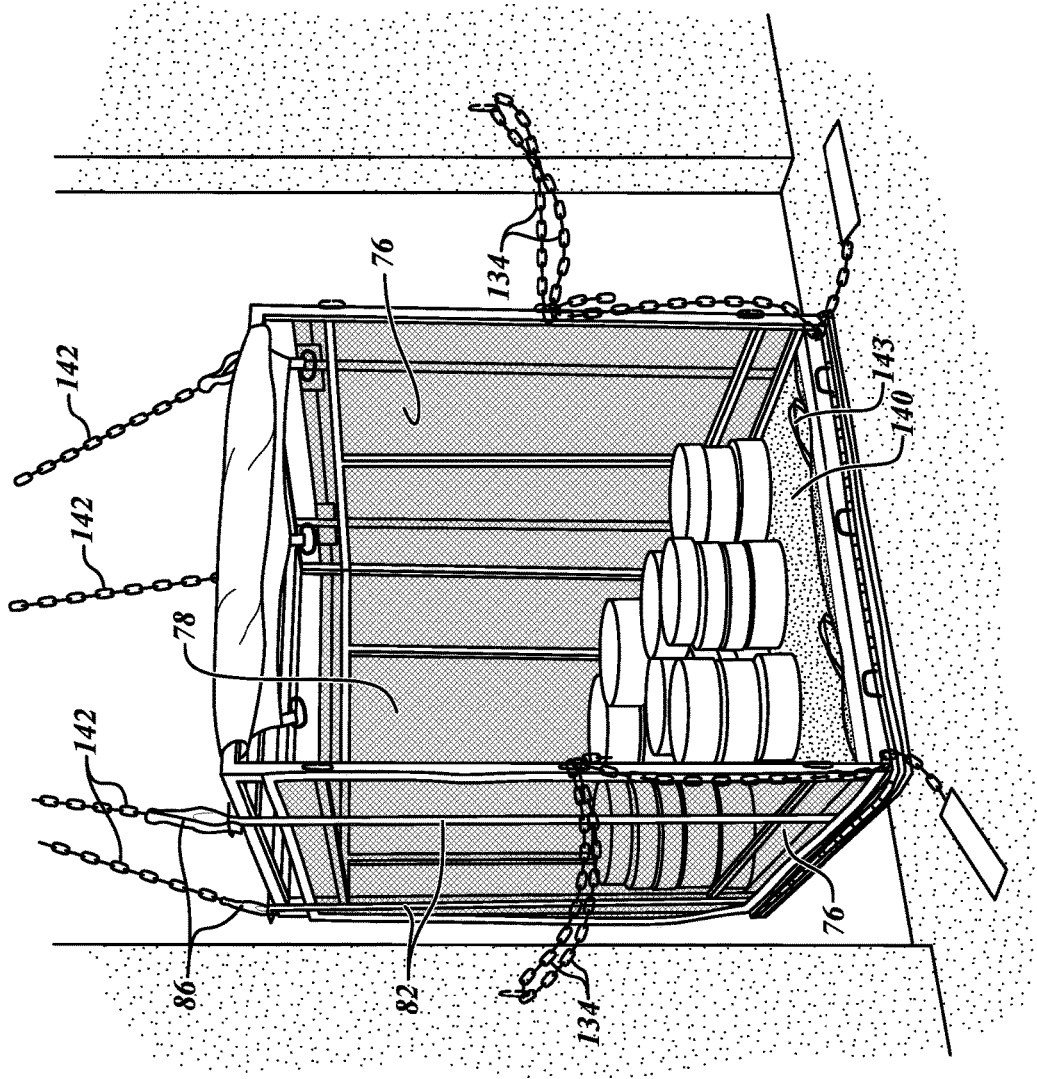
Figure 10:
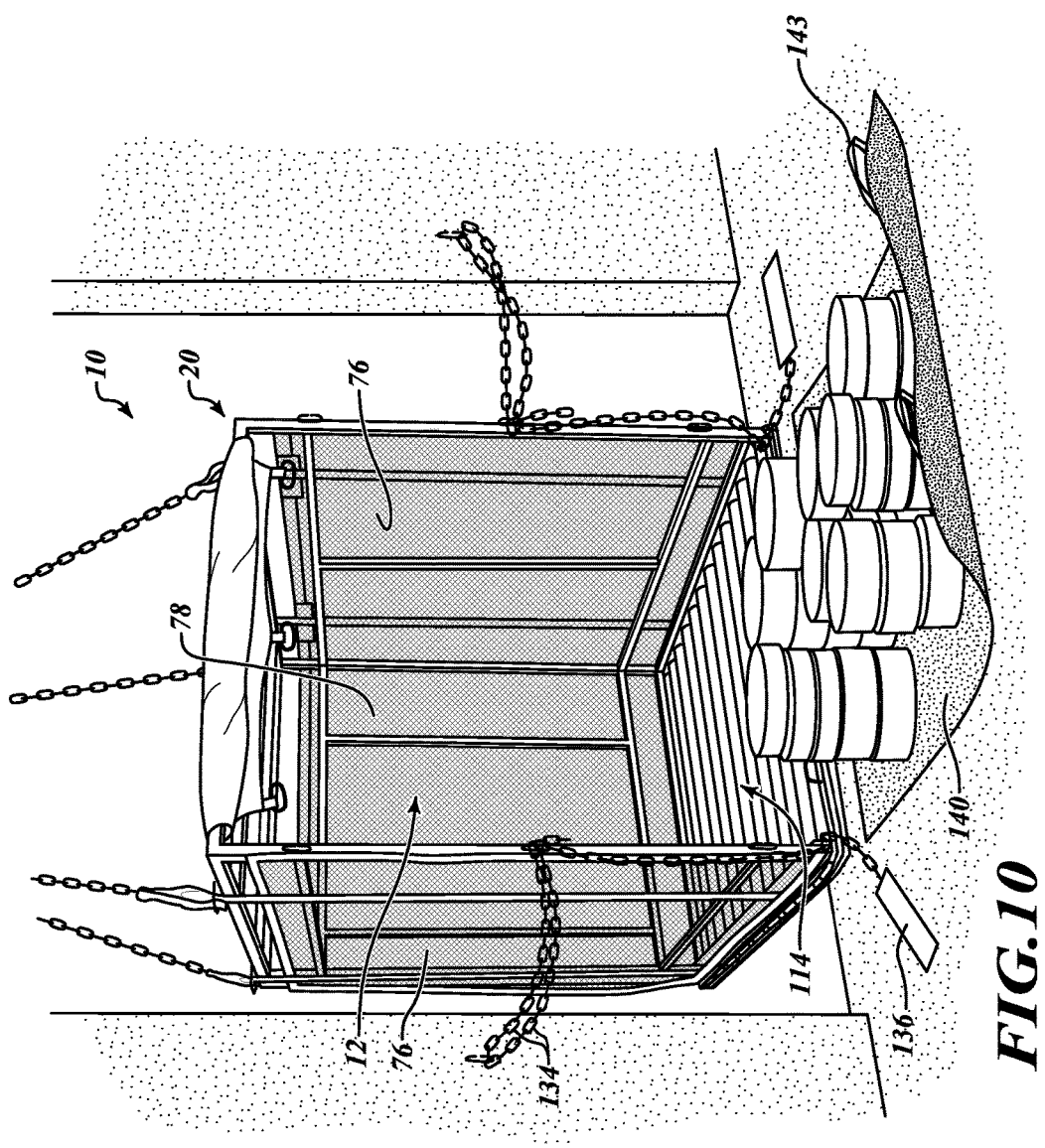
Figure 11:
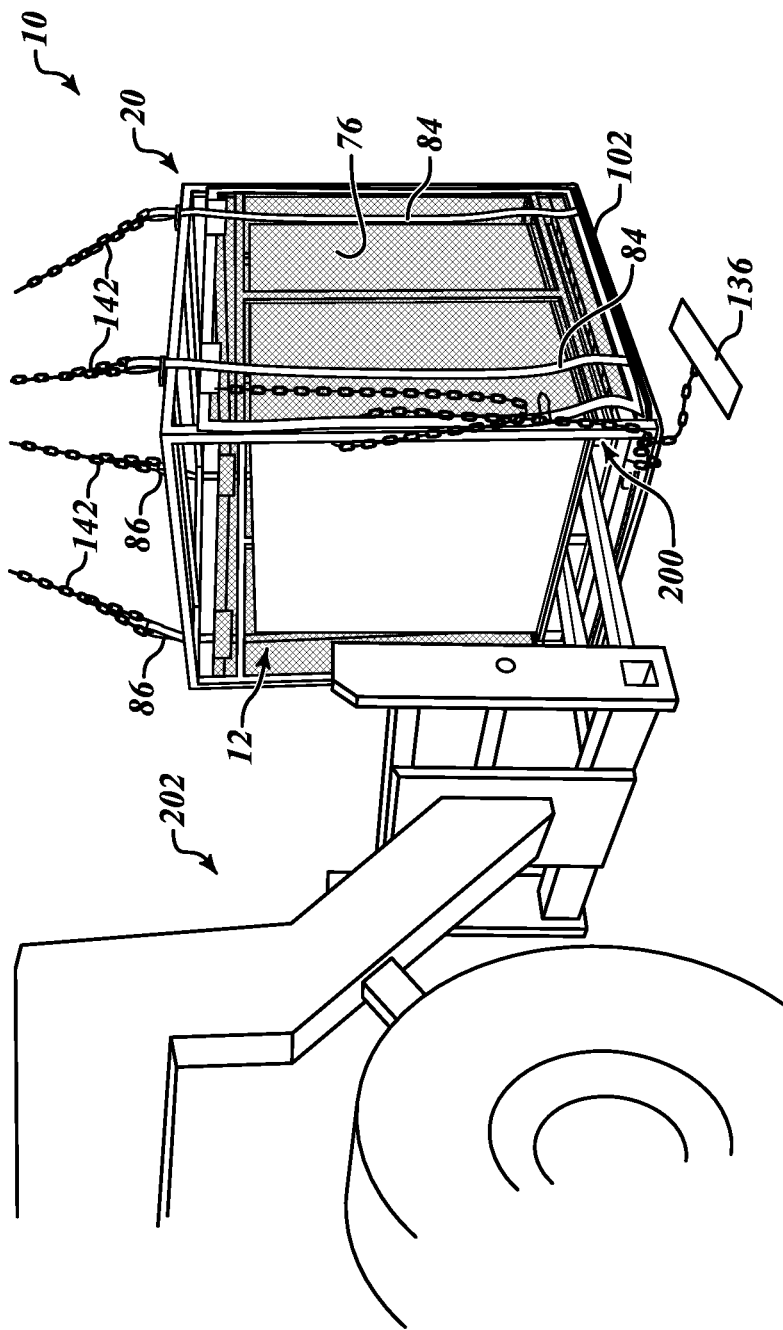

Referring to FIGS. 9-10, a procedure for hauling (with a crane) and unloading materials from the material handler 10 is described according to a non-limiting example given by way of illustration only and not of limitation. First, a crane operator causes the crane (not shown in FIGS. 9-10) to lift and move the loaded material handler 10 into position next to an opening (for example, a doorway frame) of an upper floor of a structure under construction. Next, the guard chains 134 are engaged with sides of opening of the structure to form effective guard rails for worker safety. The front cover 110 then is removed.

Next, one pulls on the handles 143 of the bottom mat 140 to slidably remove the materials from the material handler 10 into the structure. If the bottom mat 140 is not installed, one pulls out the materials directly. Because the bottom mat 140 is on the sliding mechanism 114 (or the materials are directly on the sliding mechanism 114), it is relatively easy for one to pull out the materials without stepping into the material handler 10.

If the bottom mat 140 was used, the materials are removed from the bottom mat 140 and, if there are no materials to load back into the material handler 10, the bottom mat 140 is placed back into the material handler 10. If there are materials to load back into the material handler 10, then the materials are loaded on top of the bottom mat 140 or directly onto the sliding mechanism 114. The front cover 110 is installed by engaging the C hooks 112 with the C hooks 38. The guard chains 134 are disengaged from the structure and the crane operator is signaled that the crane operator can move the material handler 10 back to the ground or to another location.

Referring to FIGS. 1-10, the material handler 10 is structured such that when hoisted by a crane, the majority of the load is borne by the mesh 70 and not the frame 20. This allows the frame 20 to be relatively light-weight and to be used primarily to maintain the shape of the material handler 10. Furthermore, the joint 100 and other structural features of the mesh 70 allow the mesh 70 to spread the force among all portions of the mesh 70 so that no one, or few, portions of the mesh 70 support the majority of the load. This can help contribute to increased safety and balancing, and can help to reduce wear of the mesh 70 that might otherwise occur at portions of the mesh 70 that support significantly more than a pro-rata share of the load.

Furthermore, if the rope 102 breaks while the material handler 10 is hoisted by a crane, the safety straps 94 and 96 bear the load previously born by the rope 102 and the bottom portion 74 of the mesh 70. This safety redundancy can help prevent the frame bottom 28, sliding mechanism 114, and materials from falling out of the bottom of the material handler 10.

Figure 12A:
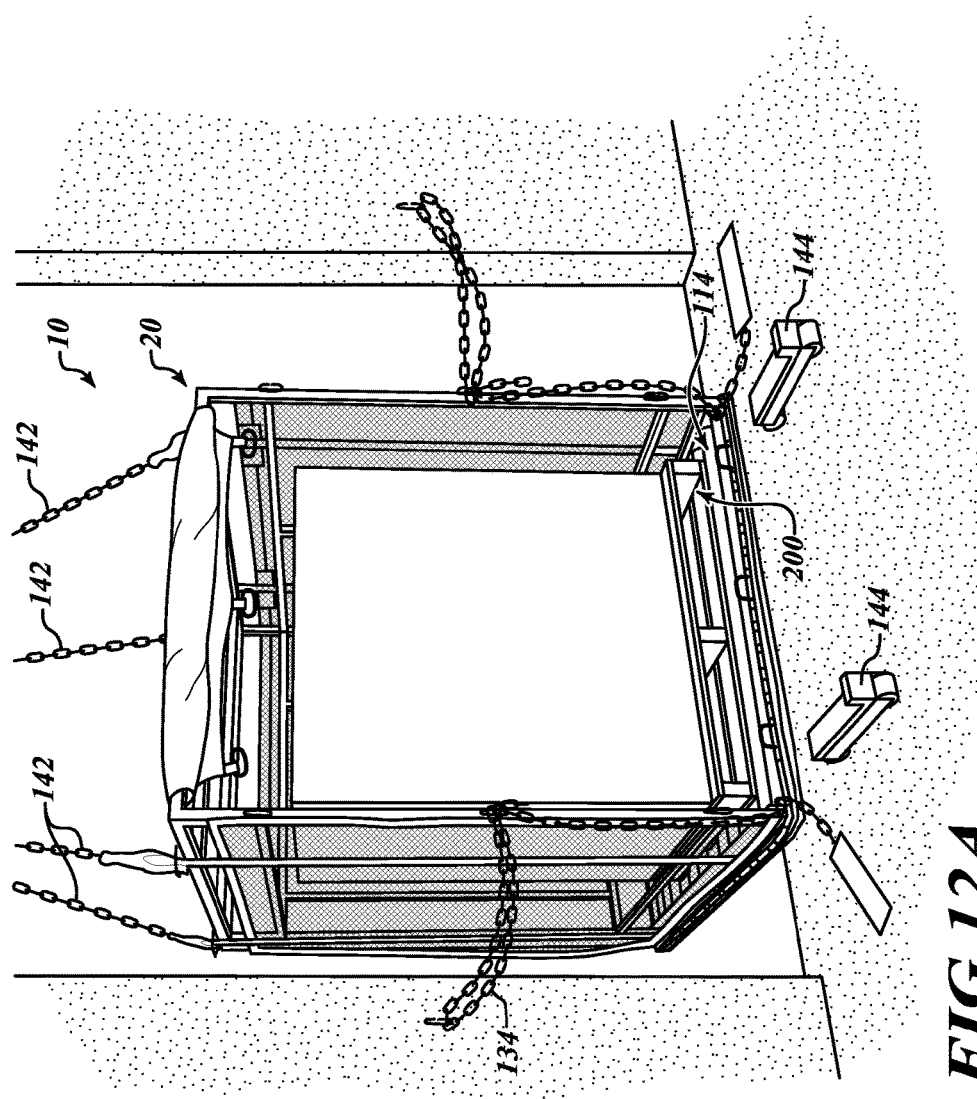

Referring to FIGS. 11 and 12A-C, a procedure for loading, hauling (with a crane), and unloading a pallet 200 of materials from the material handler 10 is described, according to a non-limiting embodiment. First, the pallet 200 is loaded, for example, manually or with a forklift 202, through the front opening 12 and directly onto the sliding mechanism 114 (the bottom mat 140 typically not being used with a pallet). Next, the brakes 136 are installed and/or engaged. Then, the front cover 110 is installed by by engaging the C hooks 112 with the C hooks 38. Next, the crane chains 142 are engaged with the strap loops 86 and 88. Then, a crane operator causes the crane (not shown in FIGS. 11 and 12A-C) to lift and move the loaded material handler 10 into position next to an opening (for example, a doorway frame) of an upper floor of a structure under construction. Next, the guard chains 134 are engaged with the sides of opening of the structure to form effective guard rails for worker safety. The front cover 110 is removed and the brakes 136 are disengaged (FIG. 12A).

Figure 12C:
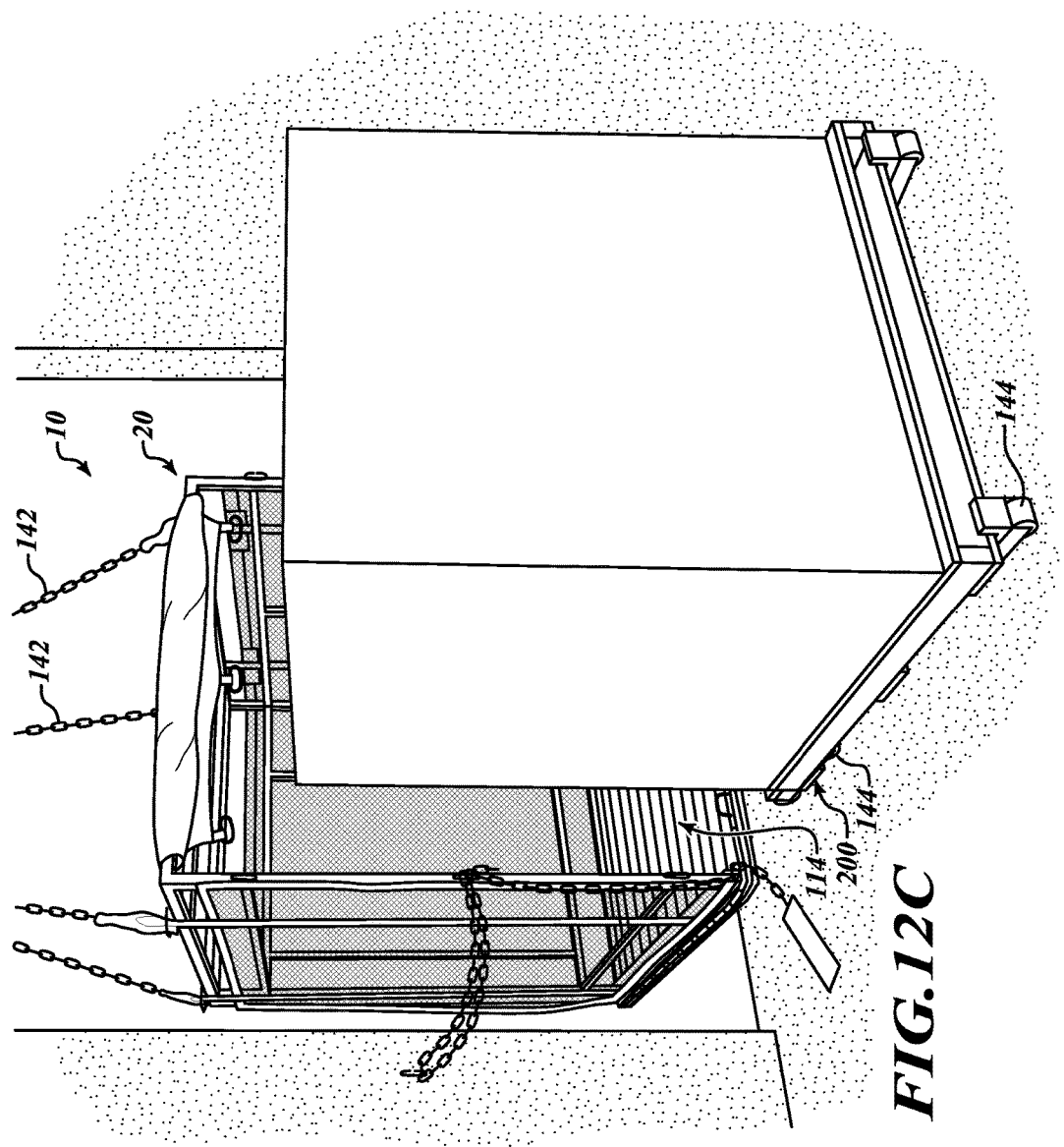

The pallet 200 is partially pulled out of the material handler 10 onto two or more pallet rollers 144 (FIG. 12B). Because the pallet 200 is disposed on the sliding mechanism 114, it is relatively easy for one to pull out the loaded pallet 200 without stepping into the material handler 10. The pallet 200 is pulled almost all the way out of the material handler 10 (at this point the back end of the pallet 200 is still on the sliding mechanism 114 and the front end is on the pallet rollers 144) onto another two or more pallet rollers 144 (FIG. 12B). The pallet 200 is pulled all the way out of the material handler 10 (at this point the pallet 200 is completely off the sliding mechanism 114 and is supported at its back and front by four or more pallet rollers 144) (FIG. 12C). If there are additional materials or another pallet 200 to load into the material handler 10, then the additional materials are loaded on top of the bottom mat 140 or the pallet 200 directly onto the sliding mechanism 114. The front cover 110 is installed by engaging the C hooks 112 with the C hooks 38. The guard chains 134 are disengaged from the structure and signals are sent to the crane operator that the crane operator can move the material handler 10 back to the ground or to another location.

Additional embodiments of the above procedures are contemplated. For example, the steps of the above-described procedures may be performed in a different order than described above, steps may be added to the procedures, and/or steps may be omitted from the procedures. Furthermore, objects other than pallets 200 may be loaded and unloaded using the pallet rollers 144.

Figure 13:
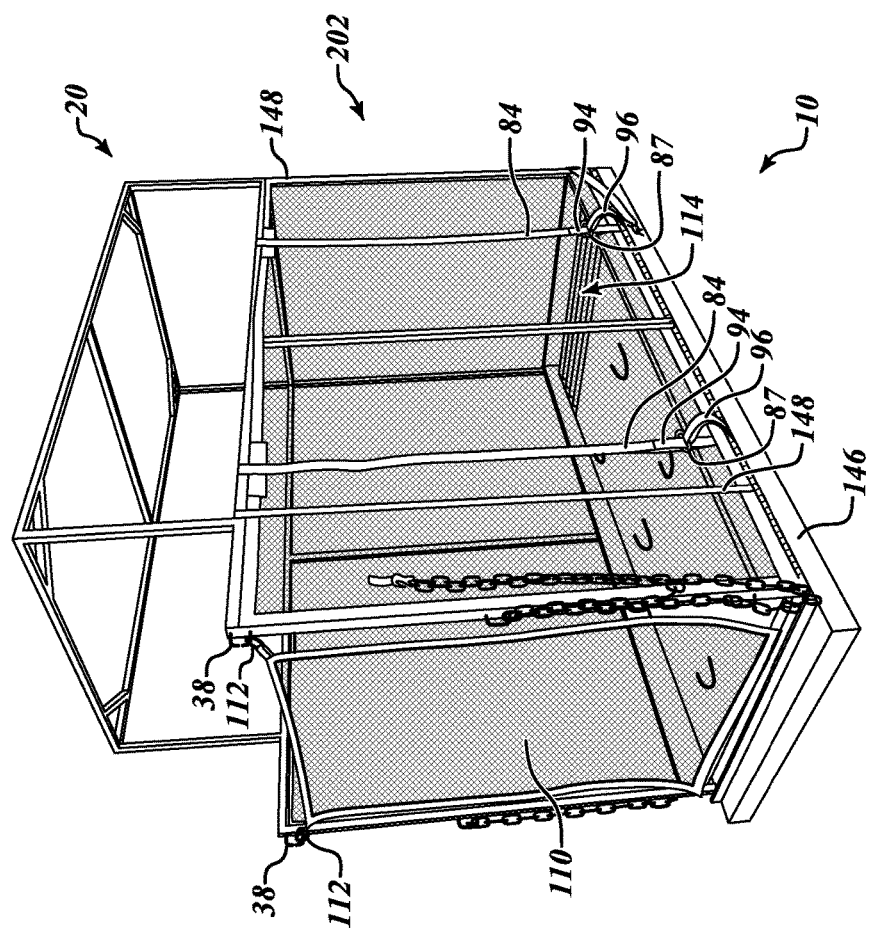
Figure 14:
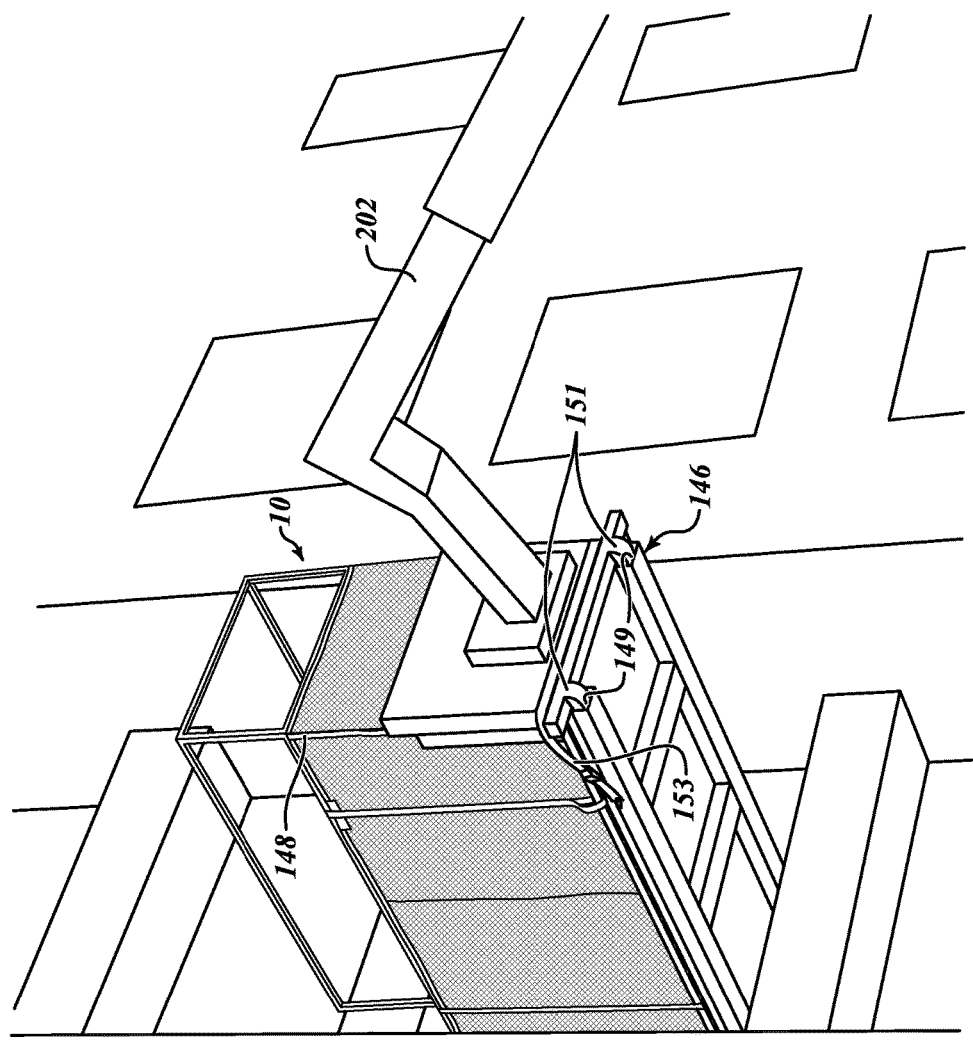

Referring now to FIGS. 13 and 14, in various embodiments a forklift rack 146 allows the material handler 10 to be transported and hoisted by the forklift 202. The forklift rack 146 supports the material handler 10 includes receptacles 149 suitable for receiving fork tongs 151 of the forklift 202. Optional straps 148 secure the material handler 10 to the forklift rack 146. An optional strap 153 secures the forklift rack 146 to the forklift 202.

In an embodiment, procedures for loading, hoisting with the forklift 202, and unloading the material handler 10 are similar to the above-described procedures for loading, hoisting with a crane, and unloading the material handler 10 with a crane, except that the forklift rack 146 is used, the strap loops 86 and 88 are not engaged with crane chains or otherwise engaged, and the forklift rack 146 bears the majority of the load of the materials inside of the material handler 10.

Figure 15:
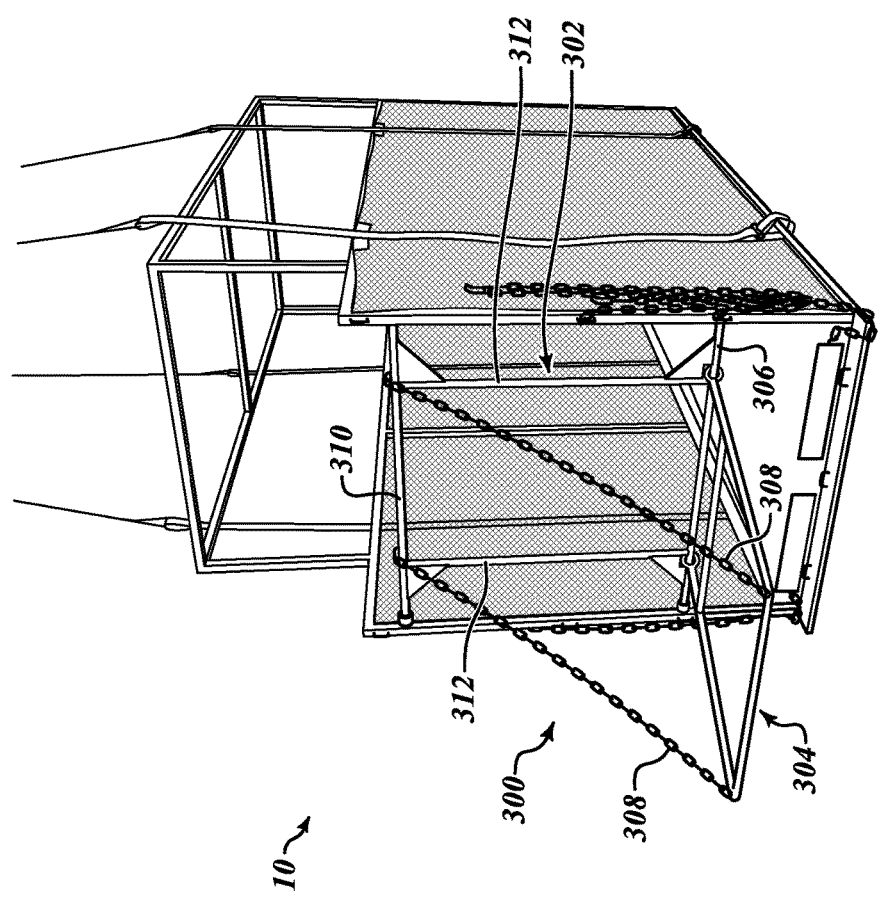
FIGS. 15-17 illustrate an illustrative extension assembly.
Figure 16:
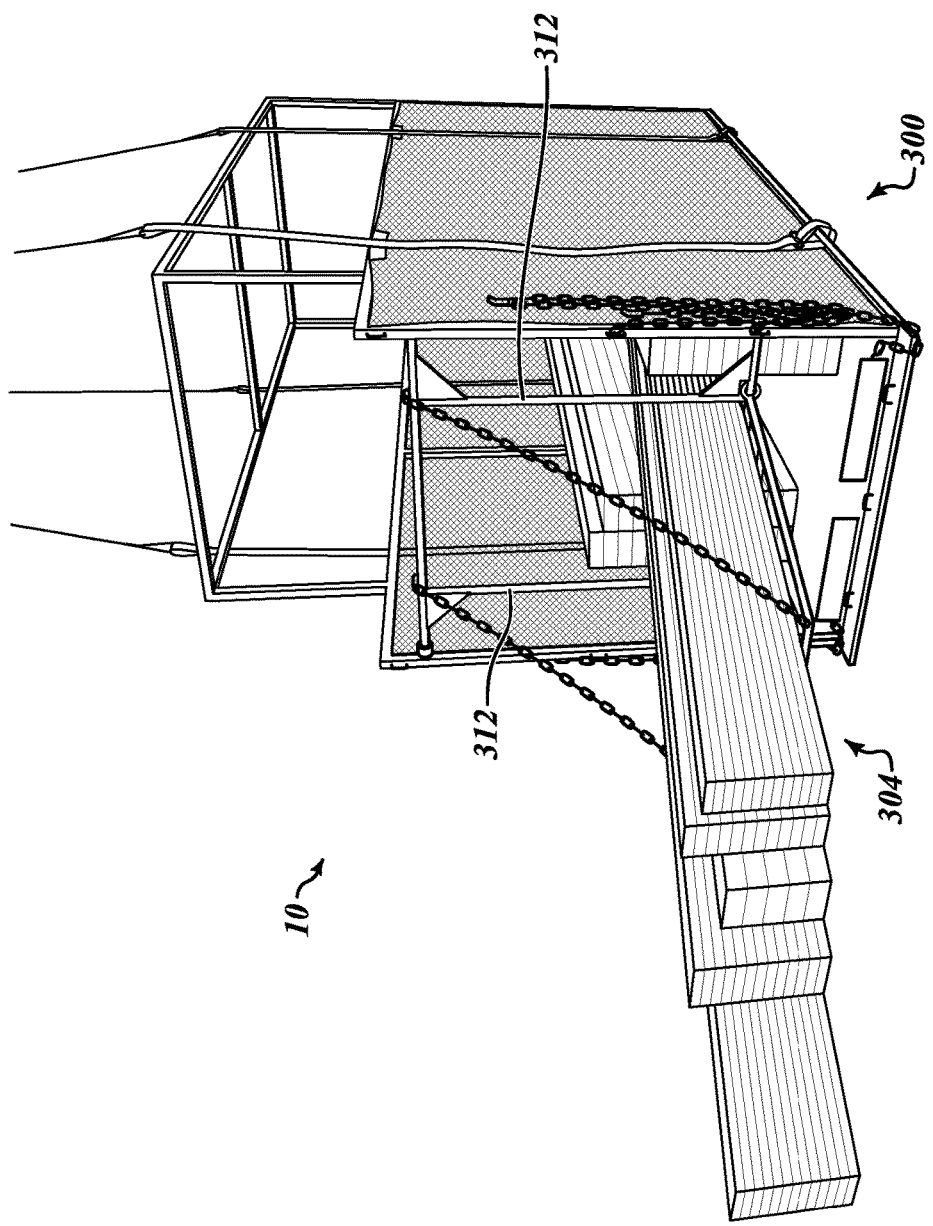
Figure 17:
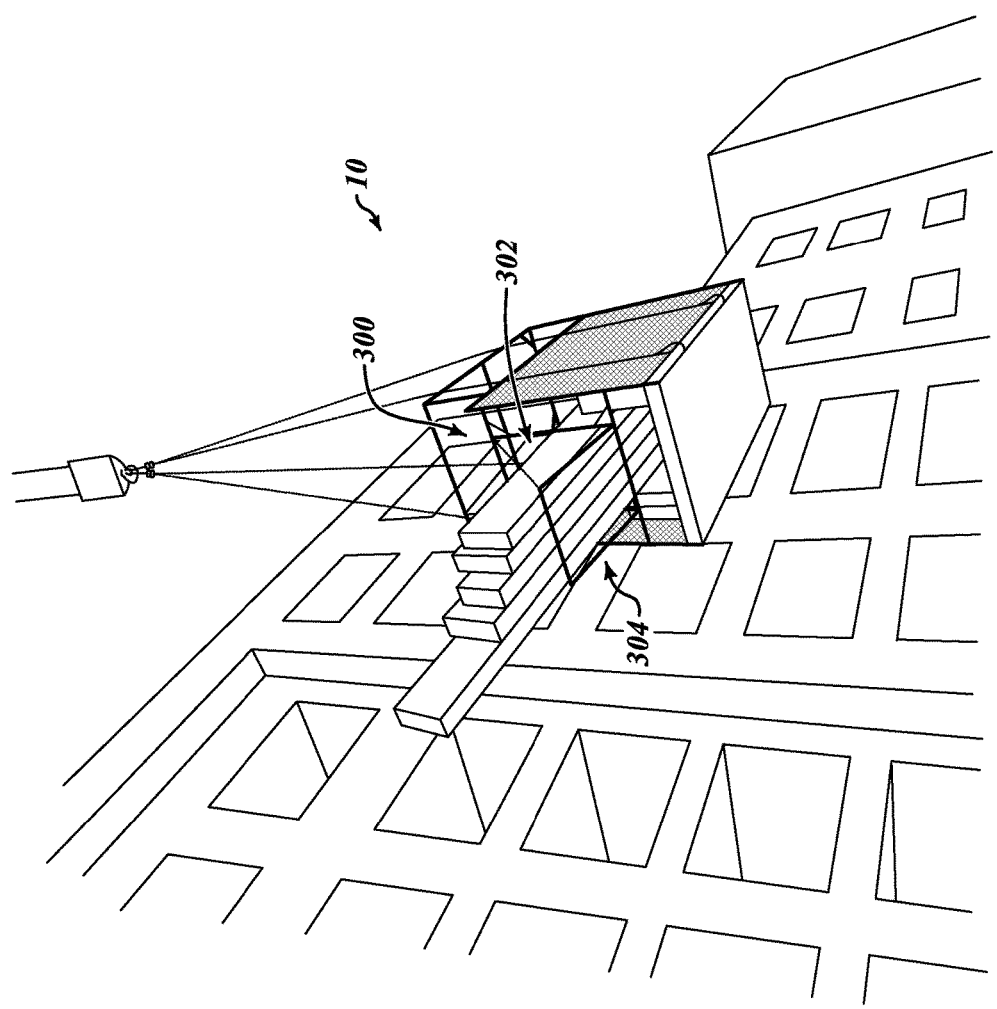
Figure 18:
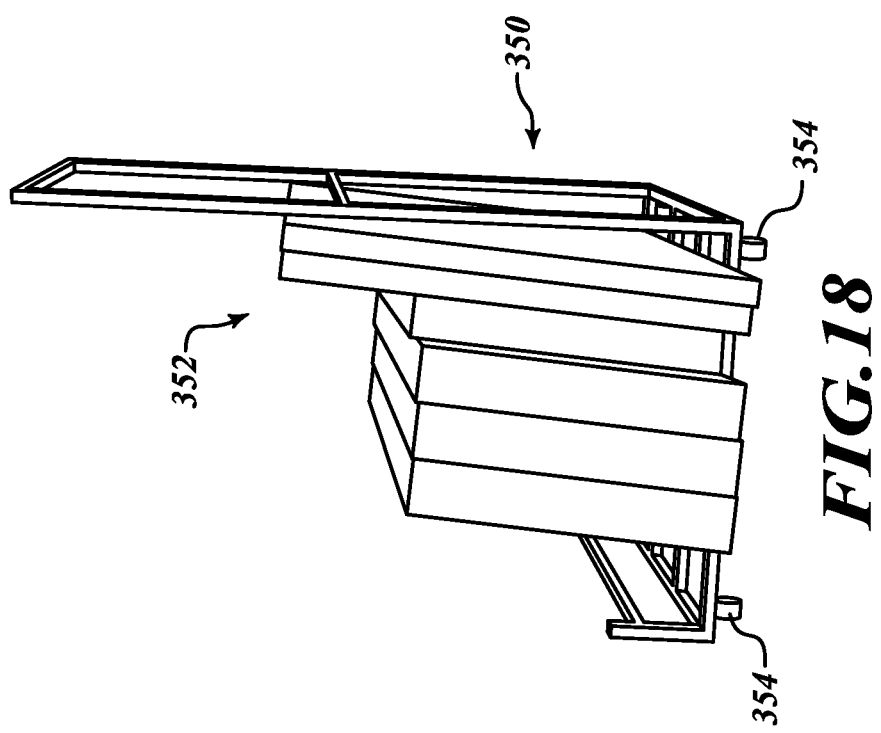
FIGS. 18-21 illustrate an illustrative rack-and-track system.
Figure 19:
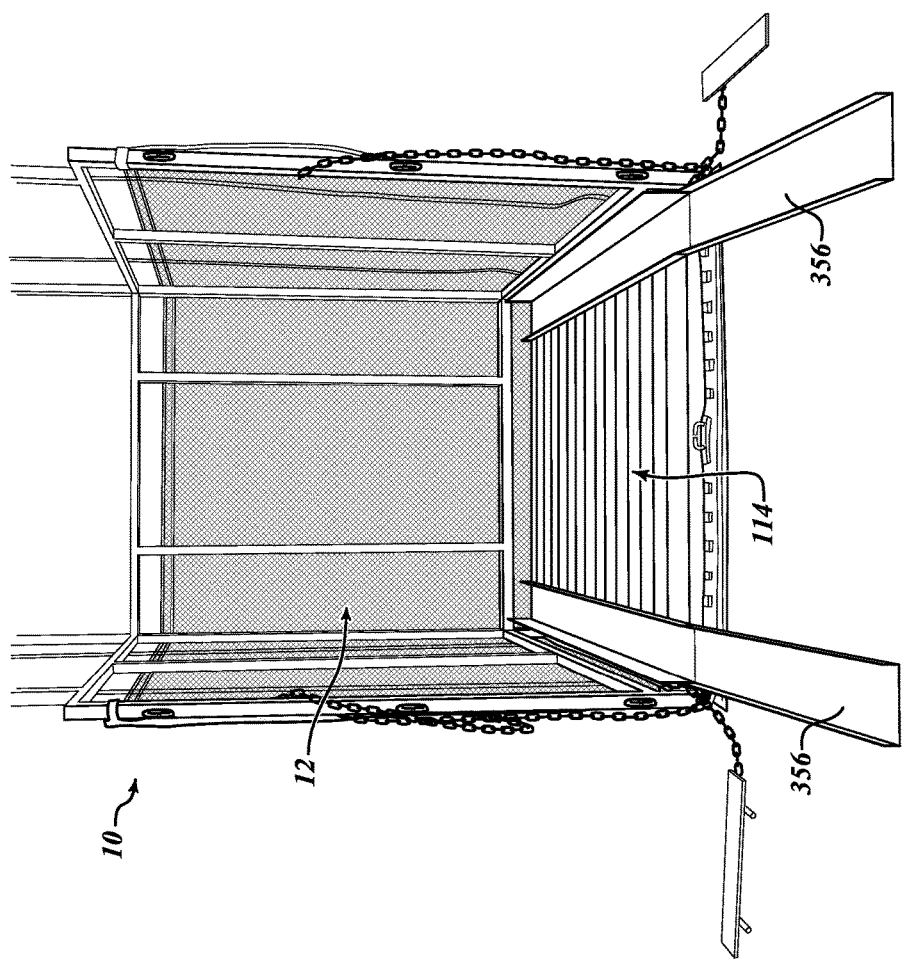
Figure 20:
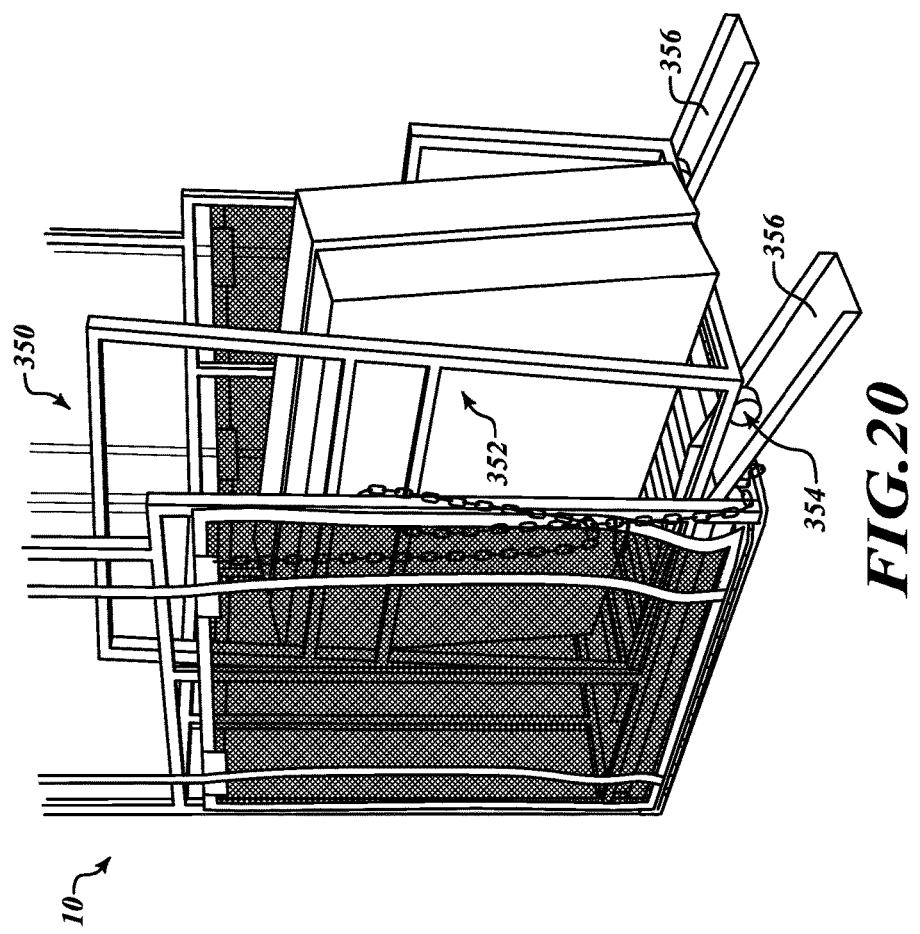
Figure 21:
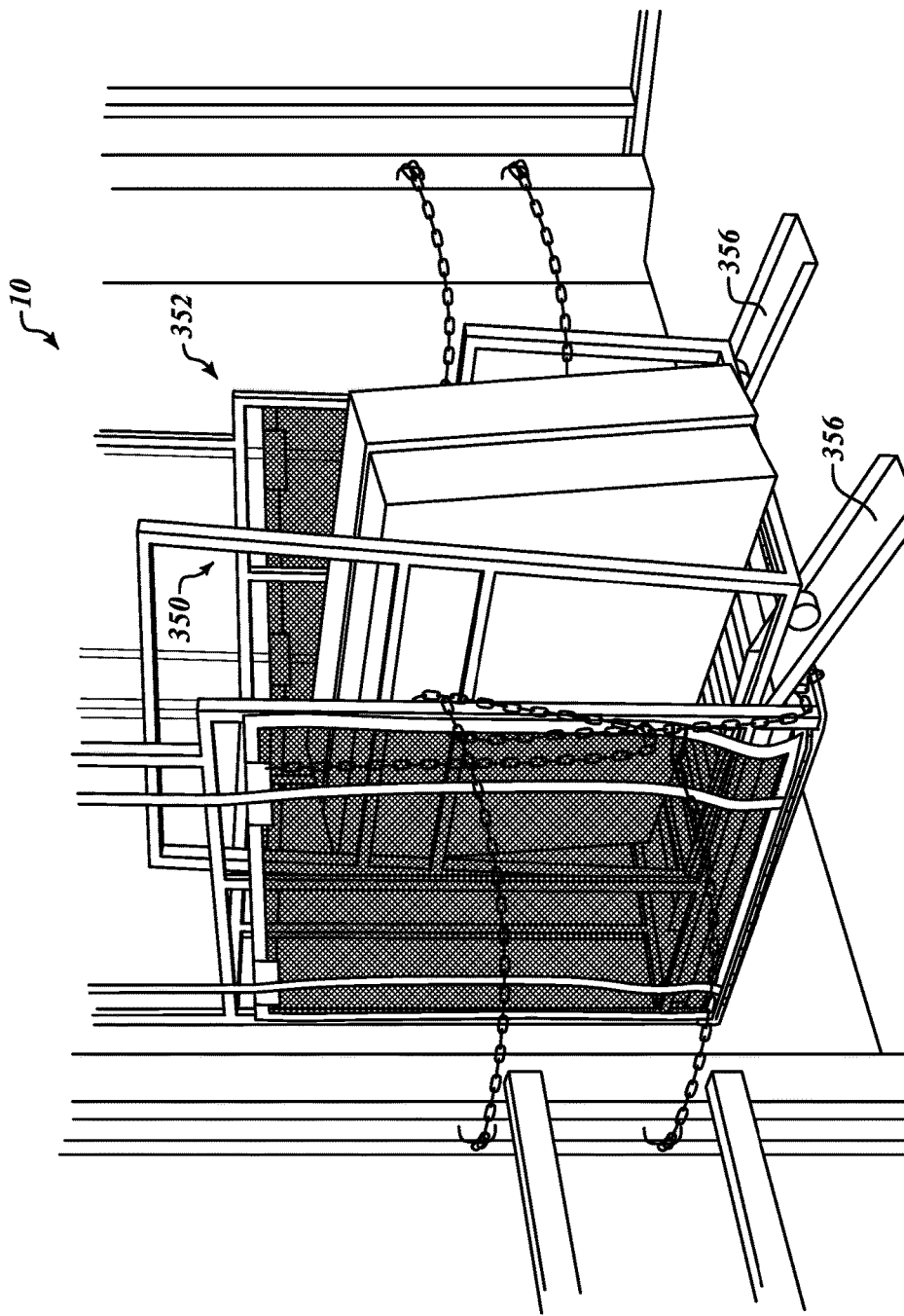

Referring now to FIGS. 15-17, an extension assembly 300 permits the material handler 10 to accommodate materials, such as boards, pipe, and the like, that are too long to fit in the material handler 10. The extension assembly 300 includes a vertical stabilizer 302 and a stabilizer extension 304. The vertical stabilizer 302 is attached to the front 12 of the material handler 10. The stabilizer extension 304 is rotatably disposed about a bottom cross member 306 of the vertical stabilizer 302 at one end of the stabilizer extension 304. Chains 308 are attached to another end of the stabilizer extension 304 and to a top cross member 310 of the vertical stabilizer 302, thereby maintaining the stabilizer extension 304 in place. As shown in FIGS. 16 and 17, materials that are too long to fit in the material handler 10 are supported by the stabilizer extension 304 and are maintained in-place side-to-side (that is, vertically stabilized) by vertical members 312.

Referring now to FIGS. 18-21, various embodiments may provide for a rack-and-track system that permits a wheeled cart, such as a rack 350 to be loaded with materials and rolled in and out of the material handler 10. The rack 350 includes a frame 352 that is configured to received materials therein. The frame 352 is disposed on wheels 354. Tracks 356 are disposable in the material handler 10 on top of the sliding mechanism 114. The tracks 356 are sized to receive therein the wheels 354. In various embodiments, the rack-and-track system is operable as follows. A rack 350 is loaded with materials as desired. Tracks 356 are placed in the material handler 10 on top of the sliding mechanism 114. The loaded rack 350 is wheeled into the material handler 10 via the tracks 356. The material is hauled in the material handler 10 to a desired location as described above. The loaded rack 350 is wheeled out of the material handler 10 via the tracks 356, and the materials are removed from the rack 350. It will be appreciated that one rack 350 may be loaded while another rack 350 is being unloaded, thereby helping provide for gains in efficiency and productivity.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While a number of illustrative embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. An apparatus for handling construction site materials, the apparatus comprising:
   a frame defining an opening therein at a front of the frame;
   a mesh configured to fit about the frame; and
   a sliding mechanism disposable in the frame and configured to permit materials to be loaded into and unloaded out of the frame through the opening, wherein the sliding mechanism includes a plurality of rolling components that are configured to slide materials in direct physical contact therewith.

2. The apparatus of claim 1, wherein the plurality of rolling components includes a plurality of rollers.

3. The apparatus of claim 1, wherein the plurality of rolling components includes a plurality of ball bearings.

4. The apparatus of claim 1, wherein the mesh includes:
   a perimeter portion configured to fit over a perimeter of the frame without covering the opening defined in the front of the frame; and
   a bottom portion configured to fit about a bottom portion of the frame.

5. The apparatus of claim 4, wherein:
   the perimeter portion of the mesh includes a plurality of first tags;
   the bottom portion of the mesh includes a plurality of second tags interleavable with the plurality of first tags; and
   a coupling member is disposed through the plurality of first tags and the plurality of second tags.

6. The apparatus of claim 1, further comprising:
   a mesh cover removably replaceable over the opening defined in the front of the frame.

7. The apparatus of claim 4, further comprising:
   a plurality of lifting straps attached to the perimeter portion of the mesh; and
   a plurality of reinforcing straps attached to the bottom portion of the mesh.

8. The apparatus of claim 7, further comprising:
   a plurality of first safety straps, each of the plurality of first safety straps being attached to an associated one of the plurality of lifting straps attached to the perimeter portion of the mesh; and
   a plurality of second safety straps, each of the plurality of second safety straps being attached to an associated one of the plurality of reinforcing straps attached to the bottom portion of the mesh, each of the plurality of second safety straps being couplable to an associated one of the plurality of first safety straps.

9. The apparatus of claim 7, wherein the plurality of lifting straps is configured to engage a crane.

10. The apparatus of claim 1, further comprising:
    a forklift rack configured to receive therein forks of a forklift, the forklift rack being further configured configured to receive thereon the bottom portion of the mesh and the bottom portion of the frame.

11. The apparatus of claim 1, further comprising:
    a mat configured to be disposed on the sliding mechanism.

12. The apparatus of claim 1, further comprising:
    a plurality of chains attached to the front of the frame and attachable to structure that defines an opening of a building under construction.

13. The apparatus of claim 1, further comprising:
    an extension assembly removably attachable to the front of the frame and configured to support materials that extend through the opening defined in the front of the frame, the extension assembly including:
       a vertical frame assembly removably attachable to the front of the frame, the vertical frame assembly defining an opening therein through which materials may extend past the front of the frame; and
       a stabilizer extension attached to the vertical frame assembly, the stabilizer extension being configured to support thereon materials which may extend past the front of the frame.

14. The apparatus of claim 1, further comprising:
    at least one wheeled cart configured to receive materials therein; and
    a plurality of tracks removably disposable on the sliding mechanism, the at least one wheeled cart being rollably travelable on the the plurality of tracks.

15. The apparatus of claim 1, further comprising:
    at least one brake assembly removably attachable to the front of the frame, the at least one brake assembly being configured to prevent material from exiting the opening defined at the front of the frame.

16. A method of fabricating an apparatus for handling construction site materials, the method comprising:
    attaching a bottom portion of a mesh to a perimeter portion of the mesh;
    disposing at least one sliding mechanism in a bottom portion of a frame, the sliding mechanism including a plurality of rolling components that are configured to slide materials in direct physical contact therewith;
    placing the bottom portion of the frame on top of the bottom portion of the mesh;
    forming a frame with frame components on top of the bottom portion of the frame such that a front of the frame defines an opening therein; and
    attaching the mesh to the frame such that the perimeter portion does not cover the opening defined in the front of the frame.

17. The method of claim 16, wherein attaching a bottom portion of a mesh to a perimeter portion of the mesh includes coupling with a coupling member a plurality of first tags of the perimeter portion of the mesh and a plurality of second tags of the bottom portion of the mesh that are interleaved with the plurality of first tags.

18. The method of claim 16, wherein attaching a bottom portion of a mesh to a perimeter portion of the mesh includes coupling each of a plurality of first safety straps attached to the perimeter portion of the mesh to an associated one of a plurality of second safety straps attached to the bottom portion of the mesh.

19. The method of claim 16, further comprising:
    removably attaching to the front of the frame an extension assembly configured to support materials that extend through the opening defined in the front of the frame.

* * * * *